United States Patent
Seppanen

(10) Patent No.: US 6,330,442 B1
(45) Date of Patent: Dec. 11, 2001

(54) CALL DIALING FOR A MOBILE TERMINAL OPERATING WITHIN A PUBLIC OR AUTONOMOUS SYSTEM

(75) Inventor: Jorma Seppanen, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/834,154

(22) Filed: Apr. 12, 2001

Related U.S. Application Data

(63) Continuation of application No. 08/982,957, filed on Dec. 2, 1997, now Pat. No. 6,233,450.

(51) Int. Cl.[7] ........................................................ H04Q 7/20
(52) U.S. Cl. .......................... 455/426; 455/463; 455/465; 455/552; 455/554
(58) Field of Search ..................................... 455/555, 552, 455/564, 426, 462, 465

(56) References Cited

U.S. PATENT DOCUMENTS 6,175,731 * 1/2001 Ohsuge .................................. 455/426

* cited by examiner

Primary Examiner—Lee Nguyen
(74) Attorney, Agent, or Firm—Brian T. Rivers

(57) ABSTRACT

A mobile terminal is provided with an access code for a destination receiving device. The access code specifies that the user terminal provide a communication signal through at least one communication network to the destination receiving device. The at least one communication network is assumed to have a capability of forwarding received communication signals that include access codes having a predetermined format to destination receiving devices. A determination as to whether a format of the access code provided to the user terminal differs from the predetermined format is performed. If these formats differ, another step includes modifying the format of the access code provided to the user terminal to produce a modified access code having the predetermined format in the communication signal.

12 Claims, 7 Drawing Sheets

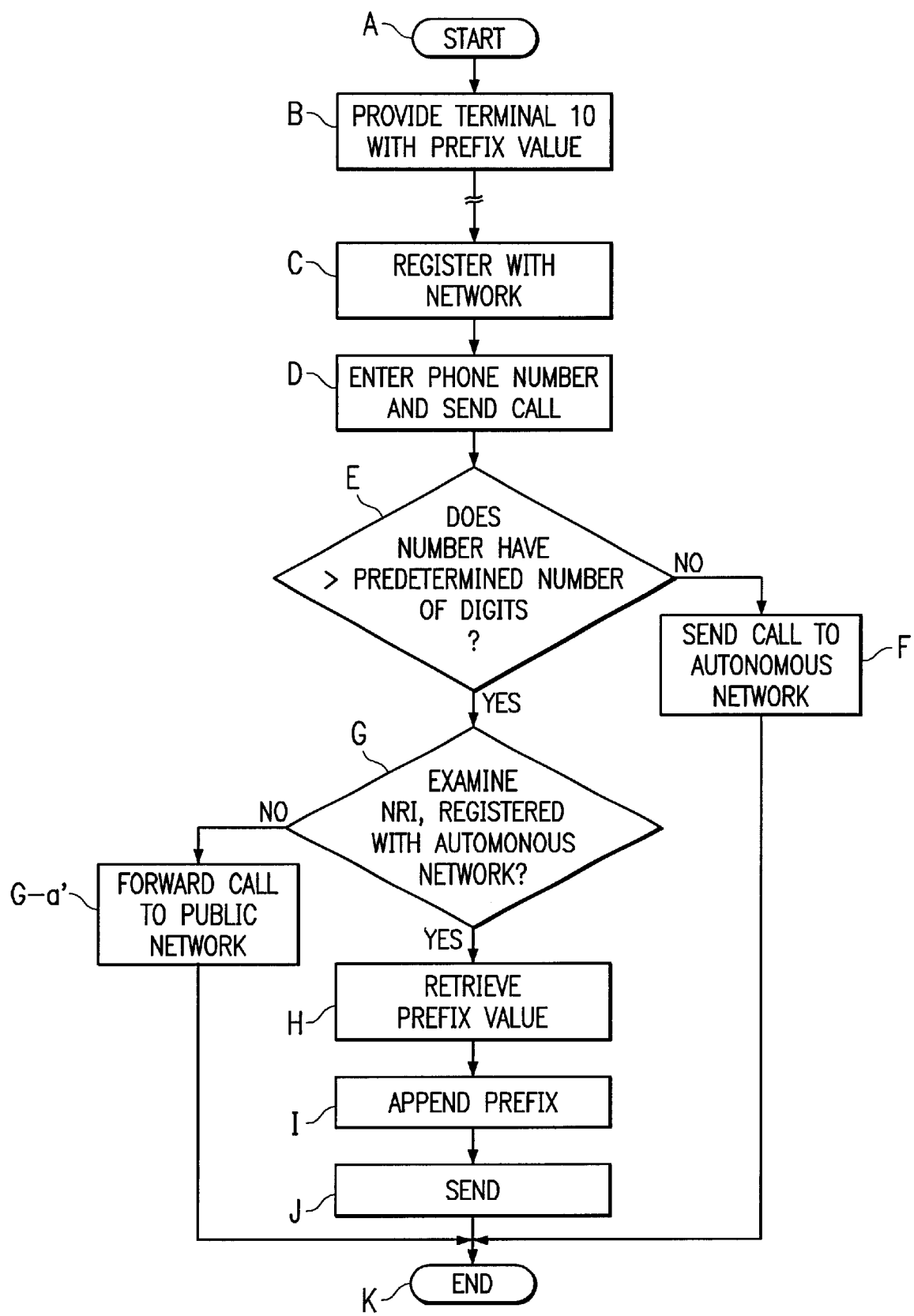

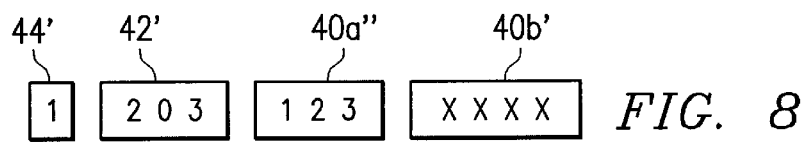
FIG. 8
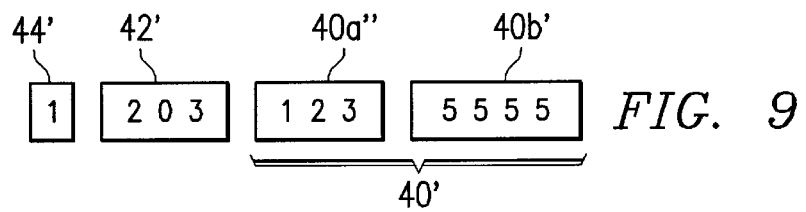
FIG. 9
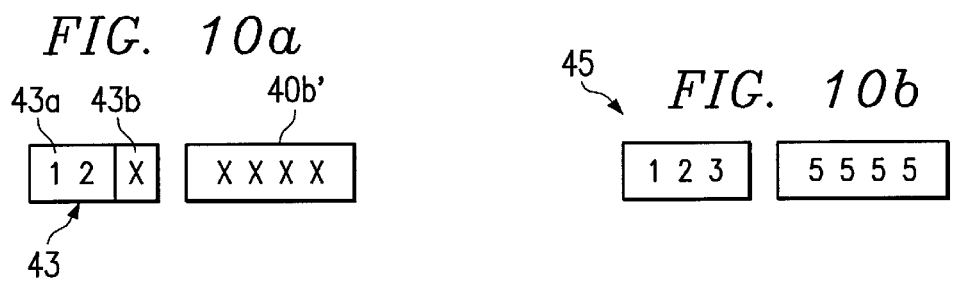
FIG. 10a
FIG. 10b
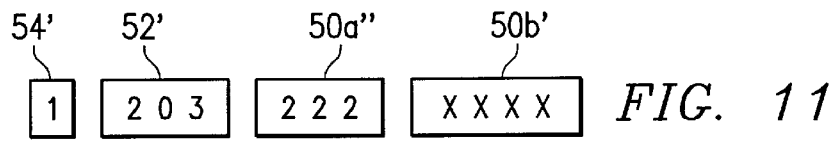
FIG. 11
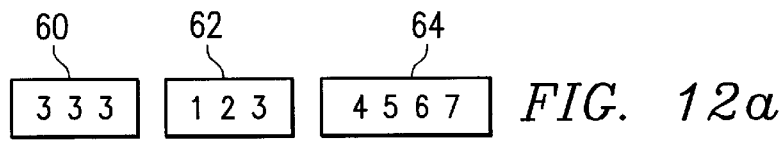
FIG. 12a
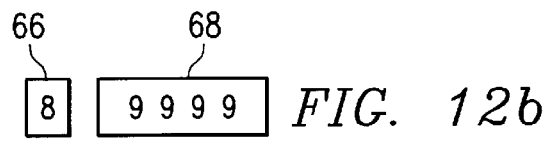
FIG. 12b
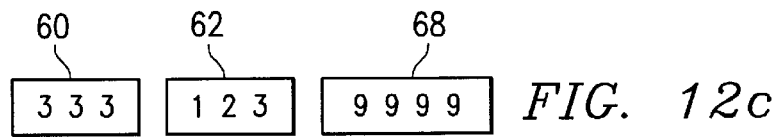
FIG. 12c

CALL DIALING FOR A MOBILE TERMINAL OPERATING WITHIN A PUBLIC OR AUTONOMOUS SYSTEM

This application is a continuation of U.S. patent application Ser. No. 08/982,957, filed Dec. 2, 1997 now U.S. Pat. No. 6,233,450.

FIELD OF THE INVENTION

This invention relates generally to radiotelephones and, in particular, to mobile terminals such as those capable of operation with a cellular network.

BACKGROUND OF THE INVENTION

At least some conventional cellular systems include both public networks (or systems) and private or autonomous networks (or systems). Autonomous networks include private and residential networks, and provide service to users located within a small, generally confined geographical area such as, for example, a house or a building. Public networks provide service to users located within a large geographical area relative to the area serviced by a private network.

Reference is now made to FIG. 7, which shows various blocks 40–46 that represent components (also referred to a "code portions") of a telephone number. Each of the components includes a predetermined number of digits that are each represented by 'X'. Block 40 includes a first portion 40a and a second portion 40b. The block 40 represents a telephone number for a telephone, and is hereinafter referred to as a 'pre-assigned telephone code'. The first portion 40a specifies an access code for a switching center, such as a Private Branch Exchange (PBX) within an autonomous network or a Message Switching Center within a public network. The second portion 40b represents an extension number for the telephone.

As is known in the art, the pre-assigned telephone code is generally employed in cases where it is desired to place a call from a source telephone located within a public network to a destination telephone located within the public network. Assuming no long distance service is required to place the call, a user of the source telephone may place the call by simply dialing the pre-assigned telephone code for the destination telephone. Typically, the pre-assigned telephone code includes seven digits.

It is known that a user of a source telephone located within an autonomous network can make a telephone call to a user of a destination telephone located within the same network by simply dialing an extension number for the destination telephone. The extension number typically includes four digits (e.g., '4444'), and is represented by the second portion 40b shown in FIG. 7. In some autonomous networks, however, extension numbers for telephones located within the network may include other numbers of digits, such as, by example, five digits (e.g., '5-4444') or three digits. For example, the combination of blocks 40a' and 40b of FIG. 7 represents a five digit extension number of a telephone located within an autonomous network.

Blocks 44 and 42 of FIG. 7 represent a long distance code and an area code, respectively, of a telephone number. As is known in the art, long distance codes and area codes need to be dialed prior to dialing a pre-assigned telephone code where it is necessary to place a call from a source telephone operating within a region serviced by one area code to a destination telephone operating within a region serviced by another area code. The long distance code 44 typically includes one digit (e.g., '1') and the area code 42 typically includes three digits (e.g., '203').

Block 46 of FIG. 7 represents a dialing prefix for an autonomous network, and is hereinafter also referred to as an "extra-network dialing code". In a conventional autonomous network, users of radiotelephones registered with the network typically need to dial a specific extra-network dialing code prior to dialing other portions of a telephone number (e.g., the pre-assigned telephone code, and one or more of the codes 42 and 44), in order to enable a call to be placed to a destination telephone located outside of the autonomous network. By example, assuming that a seven digit pre-assigned telephone code (e.g., '777-1111') is stored in a memory of a radiotelephone, and that a user operates the radiotelephone so as to retrieve the code from the memory, it is necessary for the user to edit the retrieved code by inserting a specific extra-network dialing code as a dialing prefix (e.g., '8'), before depressing one or more keys (e.g., a 'SEND' key) specifying that the call be placed. The extra-network dialing code may include one or more digits.

As can be appreciated, this procedure can be burdensome to the user. Thus, in some cases the user may attempt to avoid this problem by storing the dialing prefix along with the other portions of the telephone number within a memory of the radiotelephone for later retrieval. In this manner, each time the number is subsequently retrieved, it is not necessary to edit the number so as to include the prefix. However, this solution can present another problem in cases where the radiotelephone is registered with a public network, since no dialing prefix is normally required to place calls from radiotelephones registered with public networks. As such, assuming that the telephone number is retrieved from the memory while the radiotelephone is registered with a public network, and that the number includes the dialing prefix, it is necessary for the user to edit the retrieved number so as to remove the prefix from the number before placing the call. Otherwise, the public network will misinterpret the dialing prefix, and the call will not be successfully forwarded.

Another problem can arise in cases where a user is unsure of whether his radiotelephone is registered with the autonomous network or some other network, such as a public network. By example, it is assumed that a user who wishes to place a call to a destination telephone located outside of the autonomous network transports his radiotelephone to an area where, unknowingly to the user, the radiotelephone becomes registered with the public network. It is also assumed that at the time when the user wishes to place the call, the user incorrectly believes that the radiotelephone is registered with the autonomous network, and, as such, unwittingly enters into the radiotelephone a telephone number that includes a dialing prefix. In this case the public network will misinterpret the dialing prefix, resulting in the call not being completed successfully.

As can be appreciated, it would be desirable to provide a radiotelephone that operates in a manner which overcomes the forgoing problems, and which relieves the user of the burden of needing to specify a dialing prefix while placing a call.

Another problem related to the present invention will now be described. As was previously described, it is known that telephone calls can be made between telephones located within an autonomous network using only four or five digit extension numbers (e.g., '4444' or '54444'). It is also known that, in order to place a call from a telephone (e.g., a radiotelephone) located outside of an autonomous network to a telephone located within the autonomous network, it is necessary to dial at least a seven digit telephone number (i.e., a pre-assigned telephone code) for the destination telephone. More particularly, assuming that a call is to be placed from a source radiotelephone registered with a public network to a destination telephone located within an autonomous network, and that these networks have a similar area code, it is generally necessary to dial a seven digit telephone number (e.g., '777-1111') in order to place the call. As another example, and assuming that these networks are located within areas having dissimilar area codes, and that it is necessary to employ a long distance service to complete the call, it is generally necessary to dial an eleven digit number (e.g., '1-203-777-1111'), including an appropriate long distance code, an area code, and the pre-assigned telephone code for the destination telephone, to place the call.

A problem can arise in cases in which a radiotelephone stores one or more telephone numbers for destination telephones. By example, assuming that a memory of radiotelephone stores an extension number for a destination telephone located within the autonomous network, and that a user of the radiotelephone wishes to place a call to the destination telephone while the radiotelephone is registered with a public network, then the user needs retrieve the extension number and then add three or more digits to the extension number in order to enable the call to be placed successfully. Otherwise, the public network will typically not correctly interpret the extension number, and will not forward the call to the destination telephone.

As another example, assuming that the memory stores a telephone number having seven or more digits, and that the user wishes to place a call to a destination telephone corresponding to the stored number while the radiotelephone is registered with the autonomous network, then the user needs to edit the number after retrieval so as to eliminate the non-extension numbers therefrom, in order to enable the call to be placed successfully within the autonomous network. Otherwise, the autonomous network will not correctly interpret the telephone number, and the call will not be completed successfully.

In view of the foregoing description, it can be appreciated that it would be desirable to provide a radiotelephone which overcomes the problems described above.

OBJECTS OF THE INVENTION

It is thus a first object of this invention to provide a user terminal, such as a radiotelephone, having a capability for allowing users to place calls with users of destination telephones without needing to dial a predefined dialing prefix, even though the user terminal may be registered with an autonomous network and the destination telephones may be operating within networks other than the autonomous network.

It is another object of this invention to provide a user terminal, such as a radiotelephone, having a capability for allowing users to place calls with users of destination telephones by simply dialing extension numbers for these destination telephones, regardless of whether the user terminal is registered with an autonomous network or a public network.

SUMMARY OF THE INVENTION

The foregoing and other problems are overcome and the objects of the invention are realized by methods and apparatus in accordance with embodiments of this invention. A method of this invention is disclosed for operating a user terminal, such as a cellular radiotelephone, of a type that is bidirectionally coupled to one of a plurality of networks, such as a public network or an autonomous network (e.g., a private or residential network). The user terminal includes a keypad having a plurality of keys and a display device for displaying information, including messages, to a user.

In accordance with the invention, a method is provided that includes steps of providing the user terminal with an access code for a destination receiving device, such as a destination telephone, and specifying that the user terminal provide a communication signal to the destination receiving device through at least one communication network. By example, the access code includes a telephone number for the destination receiver device, and may be specified by the user using the keypad of the user terminal.

The at least one communication network is assumed to have a capability for forwarding received communication signals including access codes having a predetermined format to destination receiving devices. By example, assuming that the at least one communication network includes an autonomous network, and that it is desired to forward a call signal through the network to a destination receiving device located outside of the autonomous network, then it is necessary for the call signal to include an access code having a predefined dialing prefix (also referred to as an "extra-network dialing code"). The dialing prefix indicates that the call signal is to be forwarded to the destination receiving device operating outside of the autonomous network. Assuming that such a predefined dialing prefix is included in a call signal provided to the autonomous network, then the autonomous network recognizes the predefined dialing prefix and forwards the call signal to the destination receiving device operating outside of the autonomous network.

In response to the specifying step described above, another step is performed that includes determining whether a format of the access code provided to the user terminal differs from the predetermined format. By example, the access code provided to the user terminal may have a format which does not include a predefined dialing prefix, whereas the predetermined format may include the predefined dialing prefix. If the format of the access code and the predetermined format are determined to differ, another step is performed which includes modifying the format of the access code to produce a modified access code having the predetermined format. Thereafter, a further step includes providing a communication signal, including the modified access code, through the at least one network to the destination receiving device corresponding to the access code.

Also in accordance with this invention, the user terminal enables the user to place calls to destination telephones by simply dialing extension numbers for these destination telephones, regardless of whether the user terminal is registered with an autonomous network or a public network.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 shows a logic flow diagram that illustrates a method in accordance one embodiment of the invention;

FIG. 8 shows an exemplary representation of various code portions 40b', 40a", 42', and 44' of a telephone number, wherein code portion 40b' includes a mask and the code portions 44', 42', and 40a" include digits;

FIG. 9 shows an exemplary representation of the various code portions 40b', 40a", 42', and 44' of FIG. 8, wherein each code portion includes digits;

FIG. 10a shows an exemplary representation of the code portions 43 and 40b' of a pre-assigned telephone code, wherein a portion 43a of the code portion 43 includes digits, a portion 43b of the code portion 43 includes a mask, and the code portion 40b' includes a mask;

FIG. 10b shows the code portions 43 and 40b' of the pre-assigned telephone code of FIG. 10a, wherein each code portion 43 and 40b' includes digits;

FIG. 11 shows an exemplary representation of various code portions 50b', 50a", 52', and 54' of a telephone number, wherein code portion 50b' includes a mask and the code portions 54', 52', and 50a" include digits;

FIG. 12a shows exemplary codes of a telephone number;

FIG. 12b shows exemplary codes of a telephone extension number; and

FIG. 12c shows exemplary codes of another telephone number.

DETAILED DESCRIPTION OF THE INVENTION

Figure 2:
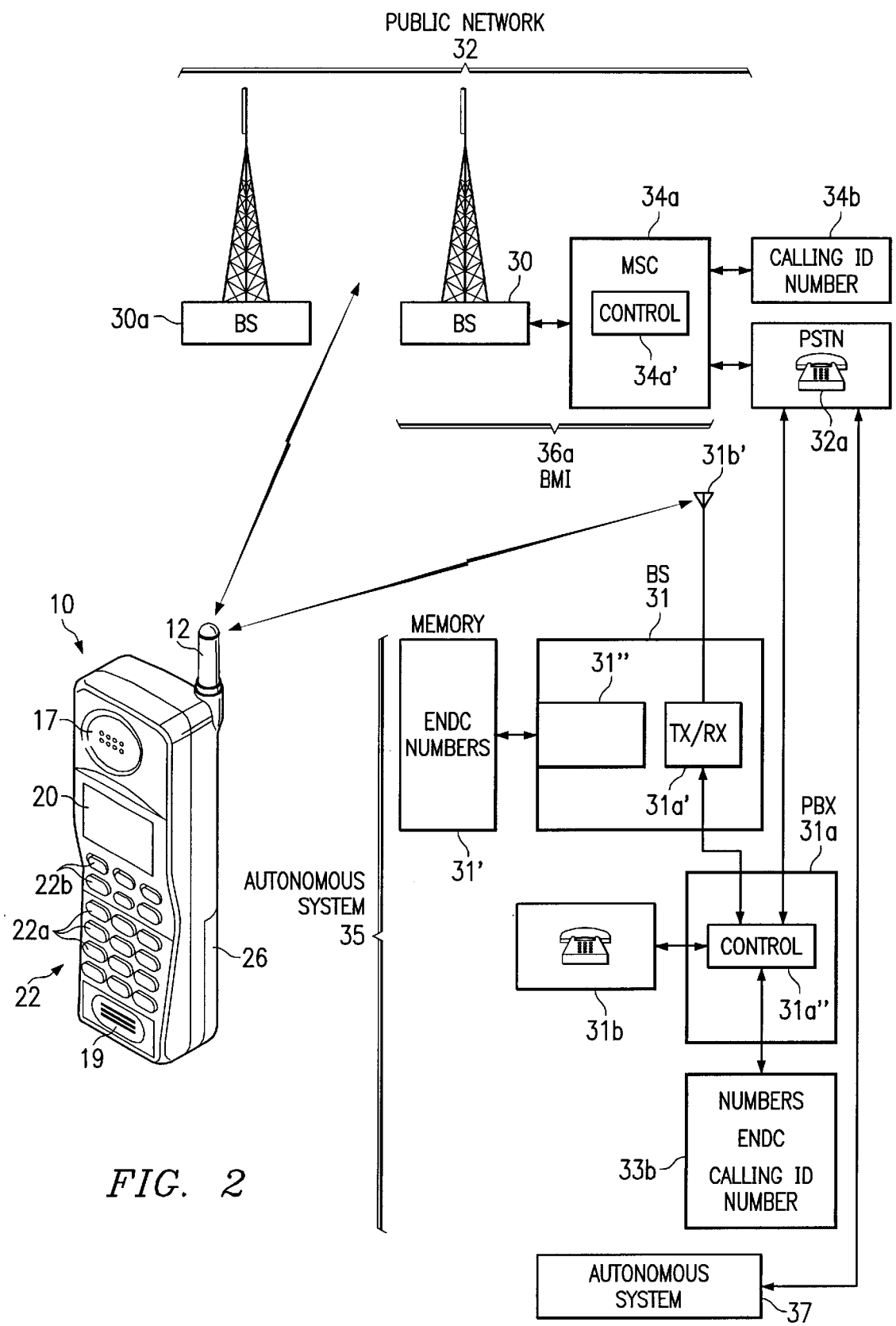
FIG. 2 is an elevational view of the mobile terminal shown in FIG. 1a, and also illustrates autonomous cellular communication systems to which the mobile terminal is bidirectionally coupled through wireless RF links, and a public cellular communication system to which the mobile terminal is bidirectionally coupled through wireless RF links.

Reference is made to FIG. 2 for illustrating autonomous cellular networks 35 and 37, a public cellular network 32, and a mobile terminal 10 (also referred to as a "user terminal"), in particular a cellular radiotelephone, that is suitable for practicing this invention. The mobile terminal 10 includes an antenna 12 for transmitting signals to and for receiving signals from base stations of the respective networks 35, 37, and 32 (for convenience, only base station 30 of the public network 32 and base stations 31 and 30a of the autonomous network 35 are shown in FIG. 2).

The autonomous network 35 includes the base station 31, a Private Branch Exchange (PBX) (also referred to as a "message station") 31a, a memory or storage device 33b that is associated with the PBX 31a, and one or more landline telephones that are collectively labeled "31b".

The storage device 33b stores telephone numbers for the telephones 31b located within the autonomous network 35. Preferably, these telephone numbers include extension numbers (i.e., four or five digit extension numbers) for respective ones of the telephones 31b. Also, in accordance with one embodiment of the invention, the storage device 33b stores information (labelled "ENDC") defining an extra-network dialing code (i.e., dialing prefix) (e.g., '8' or '9') for the network 35, and information specifying a predetermined number of digits. In accordance with a further embodiment of the invention, and assuming that the network 35 has a call identification capability, the storage device 33b also stores a telephone number (referred to as "Calling ID#) for the mobile terminal 10. This telephone number may include an extension number for the mobile terminal 10.

The base station 31 includes an antenna 31b' for transmitting signals to and for receiving signals from the mobile terminal 10. To this end the base station 31 includes a transceiver block 31a' and a controller 31" that provides signals to and receives signals from the transceiver block 31a', The base station 31 also includes a memory 31' that stores telephone numbers for telephones 31b located within the autonomous network 35, as will be described below.

The PBX 31a includes a controller 31a'", and controls the forwarding of messages to and from the mobile terminal 10 when the mobile terminal 10 is registered with the network 35. The messages may include, by example, call signals and voice messages received by the PBX 31 a from Public Switched Telephone Network (PSTN) telephones 32a, telephones 31b, and from mobile terminals (not shown) registered with the public networks and private networks (including networks 32, 35, and 37). The messages may also include, by example, call signals and voice messages received by the PBX 31a from a user of mobile terminal 10, and destined for users of destination telephones, such as telephones 32a and 31b or mobile terminals (not shown) operating within the networks 32, 35, and 37.

The PBX 31a is assumed to have a capability for forwarding received call signals to respective ones of the telephones 31b located within the autonomous network 35, based on extension numbers (e.g., a four or five digit extension numbers for the respective telephones 31b) included in the signals. By example only, assuming that one of the telephones 31b has an extension number of 2-5555, the PBX 31a forwards received call signals which include this extension number to the telephone.

The PBX 31a is further assumed to have a capability for recognizing a particular dialing prefix (also referred to as an "extra-network dialing code") included in received call signals, and for forwarding the call signals to destination telephones located outside of the autonomous network 35, based on the dialing prefix. By example, assuming that the PBX 31a receives a call signal from one of the telephones 31b, and that the call signal includes a telephone number (e.g., '777-5555') prefaced by a dialing prefix value (e.g., '9') for the network 35, wherein the dialing prefix indicates that the call is to be forwarded to a destination telephone located outside of the network 35, the PBX 31a responds by forwarding the call signal to the destination telephone by way of the PSTN 32a.

The autonomous network 37 is also shown in FIG. 2. The autonomous network 37 is assumed to include similar components as the network 35, and thus will not be described in further detail herein.

The public network 32 includes a Base Station (BS), and a Mobile Switching Center (MSC) and Interworking Function, which is also referred to as a BMI 36a. The BMI 36a includes the base station 30 and a Message Switching Center (MSC) 34a. The MSC 34a includes a controller 34a', and controls the forwarding of messages to and from the mobile terminal 10 when the mobile terminal 10 is registered with the network 35. These messages may include, by example, call signals and voice messages received by the MSC 34a from Public Switched Telephone Network (PSTN) telephones 32, and call signals and voice messages received by the MSC 34a from mobile terminals (not shown) operating within the public networks and private networks (including networks 32, 35, and 37). The messages may also include, by example, call signals and voice messages received by the MSC 34a from the mobile terminal 10, and destined for destination telephones, such as telephones 32a and 31b, or mobile terminals (not shown) registered with the networks 32, 35, and 37.

In accordance with one embodiment of the invention, the MSC 34a has an associated storage device 34b wherein is stored a telephone number for the mobile terminal 10. By example, the telephone number may include seven digits, ten digits, or eleven digits, etc. This number is identified as "Calling1 ID#"in FIG. 2.

It should be noted that the public cellular network 32 may also include one or more additional base stations 30a that communicate with the mobile terminal 10, although for the purposes of convenience, only base station 30 of the network 32 will be referred to in this description.

Figure 1A:
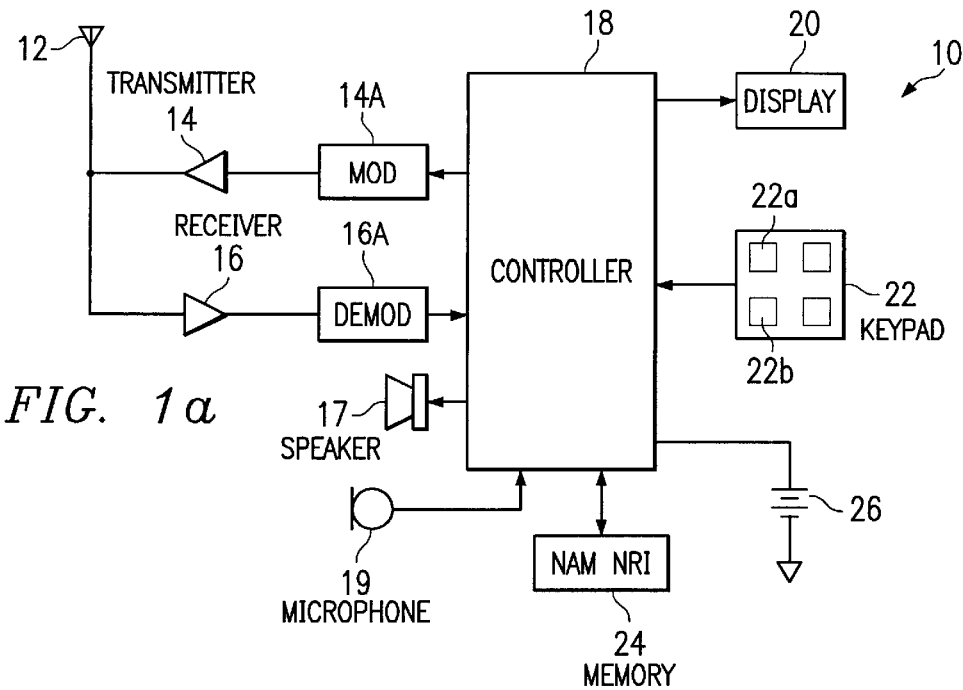
FIG. 1a is a block diagram of a mobile terminal that is constructed and operated in accordance with this invention.

Reference is now made to FIG. 1a for illustrating the mobile terminal 10 in greater detail. The mobile terminal 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard for this invention may include Short Message Service (SMS) capability. One suitable type of Teleservices capability is defined in Section 7 of IS-136.1, Rev. A, as modified by the teaching of this invention. The air interface standard for this invention may also include Over-the-Air Activation Teleservice (OATS) capability, as defined in, e.g., section 7.2 of IS-136.1, Rev. A, and as modified by the teaching of this invention. Moreover, the air interface standard for this invention may include a Test Registration capability and a System Operator Code (SOC)/Base Station Manufacture Code (BSMC) delivery capability. One suitable type of Test Registration capability is defined in section 6.3.20 (Test Registration) of IS-136.1, Rev. A, as modified by the teaching of this invention, and one suitable type of SOC/BSMC capability is defined in, by example, sections 8.3.6 (SOC and BSMC) and 6.4 (Layer 3 Message Set) of IS-136.1, Rev. A, as modified by the teaching of this invention.

Furthermore, the mobile terminal 10 and the various components of the networks 32, 35, and 37 may have a capability for performing calling line identification (i.e., caller identification) functions. In particular, in one embodiment it is assumed that the mobile terminal 10 can transmit call signals including information (i.e., the telephone number of the terminal 10) identifying the mobile terminal 10 as the originator of the call, and destination telephones which receive these call signals are assumed to have a capability for displaying the information identifying the mobile terminal 10 to a user, upon receipt of the call signals.

A user interface of the mobile terminal 10 includes a conventional speaker 17, a conventional microphone 19, a display 20, and a user input device, typically a keypad 22, all of which are coupled to the controller 18. The keypad 22 includes the conventional numeric (0–9) and related keys (#,*) 22a, and also other keys 22b used for operating the mobile terminal 10. These other keys 22b include, by example, a SEND key, various menu scrolling and soft keys, and a PWR key. The mobile terminal 10 also includes a battery 26 for powering the various circuits that are required to operate the terminal.

The mobile terminal 10 further includes a memory 24, which stores a plurality of constants and variables that are used by the controller 18 during the operation of the mobile terminal. The memory 24 also stores data, including messages (e.g., user messages), that are received from the private and/or public cellular networks 35, 37, and 32 prior to being provided to the user via the display 20 or the speaker 17. An operating program (typically in a ROM device) for controlling the operation of controller 18 is also stored in the memory 24. Moreover, the memory 24 stores the values of various cellular system parameters and the number assignment module (NAM). Furthermore, the memory 24 stores information indicating the network with which the mobile terminal 10 is registered. This information is referred to as Network Registration Indicator (NRI) information, and may be updated by the mobile terminal 10 upon registering with a network in any suitable manner known in the art. Assuming that the mobile terminal 10 is registered with one of the autonomous networks 35 or 37, the NRI information may specify, by example, the Private Operating Frequency (POF) of the network, the Private System Identification (PSID) of the network, or the Residential System Identification (RSID) of the network. See, for example, section 6.3.21 of IS-136.1, Rev. A, or later revisions thereof, for a description of the POF, section 8.3.4 of IS-136.1, Rev. A, or later revisions thereof, for a description of the PSID, and section 8.3.5 of IS-136.1, Rev. A, or later revisions thereof, for a description of the RSID. Assuming that the mobile terminal 10 is registered with the public network 32, the NRI information may include information in accordance with, by example, section 8.3 (System Identification) of IS136.1, Rev. A, or later revisions thereof.

Preferably, the memory 24 includes various memory portions, which are embodied in accordance with various embodiments of the invention, as will be described below.

It should be understood that the mobile terminal 10 can be a vehicle mounted or a handheld device. It should further be appreciated that the mobile terminal 10 can be capable of operating with one or more air interface standards, modulation types, and access types. It should thus be clear that the teaching of this invention is not to be construed to be limited to any one particular type of mobile terminal or air interface standard.

The operating program in the memory 24 includes routines to present messages and message-related functions to the user on the display 20, typically as various menu items. The memory 24 also includes routines for implementing the methods described below in relation to FIG. 3, FIGS. 4a, 4b, 5a, 5b, 6a, and 6b.

Figure 1B:
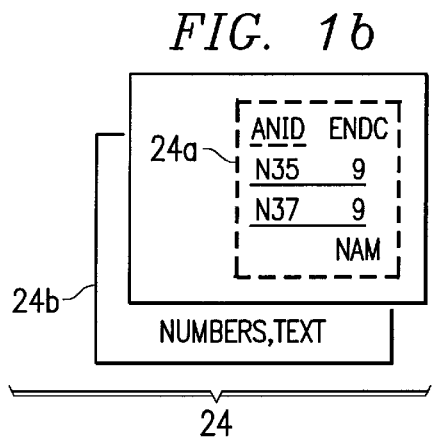
FIG. 1b shows a memory 24 of the mobile terminal of FIG. 1a in accordance with one embodiment of the invention.

Before describing the various methods of the invention, one embodiment of the memory 24 will first be described, with reference being made to FIG. 1b. In accordance with this embodiment of the invention, the memory 24 includes memory portions 24a and 24b. Memory portion 24a stores information (labelled "ANID") identifying one or more autonomous networks (e.g., network(s) 35 and/or 37) with which the mobile terminal 10 can register, and associated information (labelled "ENDC") defining corresponding extra-network dialing codes (i.e., dialing prefixes) (e.g., '8' or '9') for these networks. By example only, the ANID information may include information identifying the autonomous networks 35 and 37. For convenience, this information is identified as constants "N35" and "N37", respectively, for the respective networks 35 and 37, and may specify, by example, the Private Operating Frequency (POF) of the respective networks (see, e.g., section 6.3.21 of IS-136.1, Rev. A, or later revisions thereof), the Private System Identification (PSID) of the respective networks (see, e.g., section 8.3.4 of IS-136.1, Rev. A, or later revisions thereof), or the Residential System Identification (RSID) of the respective networks (see, e.g., section 8.3.5 of IS-136.1, Rev. A, or later revisions thereof). In accordance with one embodiment of the invention, the ANID and ENDC information is stored as part of the NAM, and the NAM is included in the memory portion 24a.

Memory portion 24b preferably stores a directory of telephone numbers. By example, these telephone numbers include extension numbers (e.g., four or five digit telephone numbers) for destination telephones and non-extension telephone numbers for destination telephones. For example, the non-extension telephone numbers may include seven digit pre-assigned telephone codes (e.g., 777-5555), ten digit telephone numbers that each include a three digit area code and a seven digit pre-assigned telephone code (e.g., 203-777-5555), eleven digit telephone numbers that include a long distance code, a three digit area code, and a seven digit pre-assigned telephone code (e.g., 1-203-777-5555), etc. The memory portion 24b also stores associated descriptive text for the telephone numbers stored therein. Each of the numbers and associated descriptive text stored in memory portion 24b may be specified, and later retrieved, by the user using keypad 22.

Reference is now made to FIG. 3 for illustrating a method in accordance with one embodiment of this invention. At Block A the method is started. Then, at block B the mobile terminal 10 is provided with the ENDC information (e.g., the extra-network dialing code, such as "9") and the associated ANID information (e.g., the POF, PSID, or RSID), and this information is stored in the memory portion 24a.

The manner in which the mobile terminal 10 is provided with the ENDC and ANID information may be in accordance with various embodiments of the invention. By example, and as was previously described, in accordance with one embodiment of the invention the ENDC and ANID information is pre-stored in the mobile terminal 10 as part of the NAM within the memory portion 24a. That is, the ENDC and ANID information may be pre-programmed into the NAM by a dealer of the mobile terminal 10.

Also by example, and in accordance with another embodiment of the invention, the ENDC and ANID information provided to the mobile terminal 10 at block B may be user-specified. For example, the user may operate the keypad 22 of the mobile terminal 10 so as to cause the terminal to enter a menu function that enables the user to then enter the ANID information, such as a PSID value of one or more autonomous networks (i.e., networks 35 and 37), and the associated ENDC information, such as an extra-network dialing code value '9' for the respective networks.

Further by example, and in accordance with another embodiment of the invention, the ANID and ENDC information may be provided to the mobile terminal 10 at block B by way of a message signal transmitted from one or more of the networks 32, 35, or 37. By example, the ANID and ENDC information may be provided to the mobile terminal 10 as part of a signal transmitted to the mobile terminal 10 from one of the networks 32, 35, or 37 during an Over-the-Air Activation Teleservice (OATS) operation. As was previously described, one suitable embodiment of the Over-the-Air Activation Teleservice is defined in section 7.2 of IS-136.1, Rev. A, or later revisions thereof, as modified in accordance with this invention. Also by example, the ANID and ENDC information may be provided to the mobile terminal 10 as part of a Short Message Service (SMS) message signal transmitted from one of the networks 32, 35, or 37 to the mobile terminal 10. The SMS message signal preferably includes information as defined in section 7.1.2.1 (SMS Deliver) of IS-136.1, Rev. A, or later revisions thereof, and, in accordance with this invention, also includes the ENDC and ANID information.

As another example, the ANID and ENDC information may be provided to the mobile terminal 10 as part of a Registration Response signal transmitted to the mobile terminal 10 from one of the networks 32, 35, or 37 during a Test Registration procedure, such as that defined in section 6.3.20 (Test Registration) of IS-136.1, Rev. A, or later revisions thereof, as modified in accordance with this invention. In accordance with this invention, information included in the Registration Response signal, as defined in section 6.3.20 (Test Registration) of IS-136.1, Rev. A, or later revisions thereof, is assumed to be modified to include the ANID and ENDC information.

As a further example, the ANID and ENDC information may be provided to the mobile terminal 10 during a System Operator Code (SOC) delivery operation or a Base Station Manufacture Code delivery operation, such as those defined in, by example, section 8.3.6 (SOC and BSMC) of IS-136.1, Rev. A, or later revisions thereof, as modified in accordance with this invention. In this case, the ANID and ENDC information may be provided from one of the networks 32, 35, or 37 to the mobile terminal 10 as part of a SOC Delivery Message or a BSMC Delivery Message signal similar to those defined in, by example, section 6.4 (Layer 3 Message Set) of IS-136.1, Rev. A, or later revisions thereof. In accordance with this invention, the information included in the SOC Delivery Message or BSMC Delivery Message is assumed to be similar to that set forth in section 6.4 of IS-136.1, Rev. A, or later revisions thereof, and further includes the ANID and ENDC information.

Some time after the ANID and ENDC information is provided to the mobile terminal 10 at block B, it is assumed that the mobile terminal 10 becomes registered with an autonomous network, such as the network 35 (block C), and that the NRI information stored in the memory 24 is updated to indicate that the mobile terminal 10 is registered with this network. The manner in which the mobile terminal 10 registers with the autonomous network at block C may be in accordance with, by example, section 6.3.14 of IS-136.1, Rev. A, or later revisions thereof.

Thereafter, at block D it is assumed that the user operates the keypad 22 so as to cause a selected one of the telephone numbers (i.e., one of the extension numbers or non-extension numbers) from the memory portion 24b to be retrieved by the controller 18 and presented on the display 20. It is also assumed that the user operates the keypad 22 so as to specify that a call be made to a destination telephone corresponding to the retrieved telephone number. By example, after retrieving the number from memory portion 24b, the user may specify that the call be made to the destination telephone by depressing the 'SEND' key of keypad 22.

It should be noted that it is also within the scope of this invention for the user to enter the telephone number into the mobile terminal 10 at block D by operation of the keypad 22, instead of retrieving the number from the memory portion 24b. It is further within the scope of this invention for the user to retrieve the telephone number at block D from a portion of the memory 24 wherein SMS messages received by the terminal 10 are stored. That is, it is within the scope of this invention that the telephone number retrieved at block D is one which was previously received by the mobile terminal 10 in a SMS message transmitted from one of the networks 32, 35, or 37.

In response to the performance of the step identified by block D, the controller 18 examines the telephone number retrieved/entered by the user at block D to determine whether or not this number includes more than a predetermined number of digits (block E). The manner in which the controller 18 determines whether or not the telephone number includes more than the predetermined number of digits may be in accordance with any suitable technique known in the art. By example, the controller 18 may make this determination by comparing the total number of digits entered/retrieved by the user at block D to the predetermined number of digits.

Preferably, the predetermined number of digits includes six digits. This is because in a case where the mobile terminal 10 is registered with network 35, and the user enters or retrieves a telephone number (e.g., 555-3333) having seven or more digits at block D in order to initiate a call while the mobile terminal 10 is registered with network 35, it can be assumed that the call is intended to be transmitted to a telephone located outside of the network 35, rather than within the network, since if the call were intended to be forwarded to a telephone within the network 35, the user would presumably have entered/retrieved an extension number (e.g. having three, four, or five digits) at block D. The predetermined number of digits may be provided to the mobile terminal 10 along with ANID and ENDC information, in accordance with the step identified by block B, wherein the predetermined number of digits is stored in the memory 24.

It should be noted that the use of network feature codes may also be checked at block E. By example, assuming that a feature code for a particular network may include '88', this code may be appended to an extension code '1234', to provide a number'88-1234'. In this case, it is preferred that the predetermined number of digits accounts for the number of digits included in both the feature code and the extension code. By example, assuming that the number entered/ retrieved at block D includes '88-1234', then it is preferred that the predetermined number of digits includes six digits rather than a lesser number of digits, so that the step identified by block E does not result in an incorrect determination that the entered/retrieved number is for a destination telephone located outside the network 35.

If at block E it is determined that the entered/retrieved telephone number does not include more than six digits ('n' at block E), indicating that the call is intended to be sent to a destination telephone located within the network 35, then the mobile terminal 10 responds by transmitting a call signal to the autonomous network 35. The autonomous network 35 then forwards the call signal to the destination telephone within the network 35. Thereafter, at block K the method is terminated.

If at block E it is determined that the number entered/ retrieved by the user at block D does include more than six digits ('y' at block E), indicating that the call is intended to be sent to a destination telephone located outside of the network 35, then the controller 18 responds by examining the NRI information stored in the memory 24 to determine the network with which the mobile terminal 10 is registered (block G). By example, it is assumed that the controller 18 determines that the mobile terminal 10 is registered with the autonomous network 35 at block G. Thereafter, at block H the controller 18 correlates the NRI information to the ANID information (from memory portion 24a) identifying the network indicated by the NRI information, and then retrieves the extra-network dialing code for this network (block H). By example, the controller 18 retrieves extra-network dialing code N35 for the autonomous network 35 from memory portion 24a at block H.

Thereafter, at block I the controller 18 appends the extra-network dialing code retrieved at block H to the number entered/retrieved by the user at block D to form a modified version of the number. In this manner, the previously entered/retrieved number, which is assumed to have a first format where no extra-network dialing code is included in the number, is modified so as to have a second format which includes the extra-network dialing code retrieved previously at block H.

Preferably, the step of appending is performed by appending the extra-network dialing code as a prefix to the number. The mobile terminal 10 then transmits a call signal that includes the modified version of the number to the autonomous network 35 (block J), which then responds by forwarding the signal to a destination telephone corresponding to the number, via the PSTN 32. At block K the method is then terminated.

As another example, it is assumed that the mobile terminal 10 registered with the public network 32 at block C rather than with the autonomous network 35, and that at block E it is again determined that the number entered/ retrieved by the user at block D includes more than six digits ('y' at block E), indicating that the call is intended to be sent to a destination telephone located outside of the network 35. In this case, the performance of the step identified as block G (i.e., the examination of the NRI information) results in the controller 18 determining that the mobile terminal 10 is registered with the public network 32 rather than with the autonomous network 35 ('no' at block G). Thereafter, the mobile terminal 10 transmits to the public network 32 a call signal that includes the telephone number entered/retrieved previously at block D (block G-a). After receiving this call signal, the network 32 forwards the signal to the destination telephone corresponding to the telephone number. Thereafter, control passes to block K where the method is terminated.

In accordance with another embodiment of the invention, the extra-network dialing code may be appended to the entered/retrieved number by the PBX 31a rather than by the mobile terminal 10. By example, in this embodiment of the invention, the method described above is performed in a similar manner as was described above, except that the mobile terminal 10 is not provided with the ANID and ENDC information at block B, and it is assumed that the steps indicated by blocks G and G-a' are not performed. Also, assuming that the mobile terminal 10 registers with the network 35 at block C, and that the step identified by block D is performed, the mobile terminal 10 responds by transmitting a call signal to the network 35, wherein the signal is received by the base station 31 and forwarded to the PBX 31a, and ultimately, to controller 31a". The call signal includes the telephone number entered/retrieved by the user at block D. In response to receiving this signal, the controller 31a" of PBX 31a extracts the telephone number from the signal, retrieves the information specifying the predetermined number of digits from the storage device 33b, and then performs the step identified by block E in a similar manner as was described above to determine whether or not the telephone number includes more than the predetermined number of digits. If 'no' at block E, indicating that the call signal is intended to be sent to a destination telephone 31b located within the network 35, then the PBX 31a forwards the call signal to this destination telephone 31b (block F), and the method is terminated at block K. If 'yes' at block E, indicating that the call signal is intended to be sent to a destination telephone located outside of the network 35, then control passes to block H where the controller 31a" of PBX 31a retrieves the ENDC information (i.e., the extra-network dialing code for network 35) for the network 35 from the storage device 33b. Thereafter, at block I the controller 31a of the PBX 31a appends the extra-network dialing code retrieved at block H to the telephone number extracted from the received call signal to form a modified version of the number (i.e., a version of the number having a modified format). Preferably, the step of appending is performed by appending the extra-network dialing code as a prefix to the number. Based on the retrieved extra-network dialing code, the PBX 31a recognizes that the call signal is to be transmitted outside of the network 35, and then transmits the call signal, including at least the user-specified telephone number, to the PSTN 32a (block J), which then responds by forwarding the signal to a destination telephone corresponding to the number. At block K the method is then terminated.

Figure 1C:
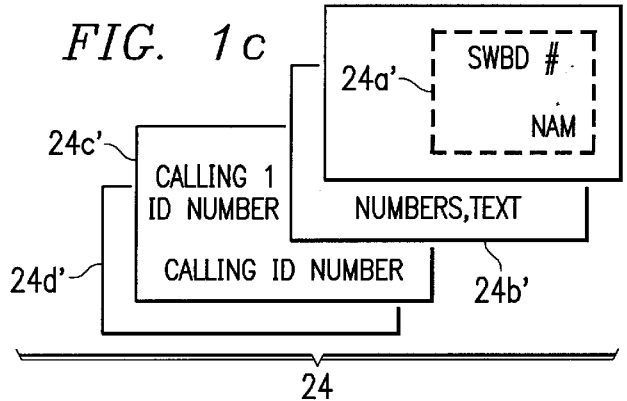
FIG. 1c shows the memory 24 of the mobile terminal of FIG. 1a in accordance with another embodiment of the invention.

Another embodiment of the invention will now be described. In accordance with embodiment of the invention, and referring to FIG. 1c, the memory 24 includes memory portions 24a'-24d'. Memory portion 24a stores information identified as "SWBD#". Referring to FIG. 8, the SWBD# information preferably has a format that includes at least a first code portion 40a" and a second code portion 40b'. The first code portion 40a" preferably includes a code for accessing a switch within a particular autonomous network, and represents a first code portion of a pre-assigned telephone access code for telephones located within the autonomous network. By example, it is assumed that the first code portion 40a" specifies a code '123' for accessing the PBX 31a of the autonomous network 35, and also corresponds to a first portion of pre-assigned telephone codes (e.g., 123-5555,123-5556, 123-5557, etc.) for the telephones 31b located within this network 35. The second code portion 40b' preferably includes a mask, wherein extension numbers for selected ones of the telephone 31b may be inserted in accordance with this embodiment of the invention in order to enable a call to be placed to these telephones 31b while the mobile terminal 10 is registered with a network other than network 35, as will be described below.

It should be understood that, depending on whether or not the mobile terminal 10 is employed in an area where a long distance service is required to place a call from the terminal 10 to telephones 31b within the autonomous network 35, the SWBD# information may also include additional code portions, such as those shown as blocks 42' and 44' of FIG. 8. These blocks represent an area code and a long distance code, respectively, and are similar to the blocks 42 and 44, respectively, of FIG. 8. It should be noted that, although not shown in FIG. 8, other applicable codes (e.g., country codes) may also be employed for the SWBD# information, depending on the area(s) in which the mobile terminal 10 is employed, and on applicable tele-services requirements.

Moreover, it should be noted that the codes shown in FIG. 8 are intended to be representational in nature, and that other selected codes having suitable numbers of digits may also be employed. The SWBD# information may be prestored in memory portion 24a, or may be specified by the user in a manner as will be described below.

In accordance with one embodiment of the invention, the SWBD# information is stored as part of the NAM, and the NAM is stored in memory portion 24a.

Memory portion 24b' stores a directory of extension numbers for telephones located within one or more autonomous networks, and also stores descriptive text associated with these extension numbers. The extension numbers and associated descriptive text may be specified, and later retrieved, by the user using keypad 22. Each extension number preferably includes a predetermined number of digits (e.g., four digits), and is assumed to correspond to a respective one of the telephones 31b located within the autonomous network 35.

Memory portion 24c' stores a telephone number for the mobile terminal 10. Preferably, the telephone number includes an extension number (e.g., a four digit extension number) for the mobile terminal 10. The telephone number stored in memory portion 24c' may be included in a call signal sent from the mobile terminal 10 to identify the mobile terminal 10 as an originator of a call, in accordance with a caller identification function. The telephone number of the mobile terminal 10 is referenced in FIG. 1c as "calling ID#". In accordance with one embodiment of the invention, the memory portion 24c' also stores another telephone number for the mobile terminal 10, which includes the extension number and selected pre-extension numbers (e.g., a telephone number including seven, ten, or eleven digits). This telephone number is identified as "calling1 ID#"in FIG. 1c.

Memory portion 24d' functions as a memory buffer for storing information retrieved by the user from one or more of the memory portions 24a–24c', prior to the transmission of the information from the mobile terminal 10. Memory portion 24d' also stores information entered into the mobile terminal 10 by the user for being transmitted from the mobile terminal 10 or stored in other ones of the memory locations 24a–24c'. By example, after a telephone number is entered into mobile terminal 10 by the user, or retrieved by the user from one of the memory portions 24b' or 24c', the entered/retrieved number is stored in memory portion 24d', prior to transmission from the terminal 10.

Figure 4A:
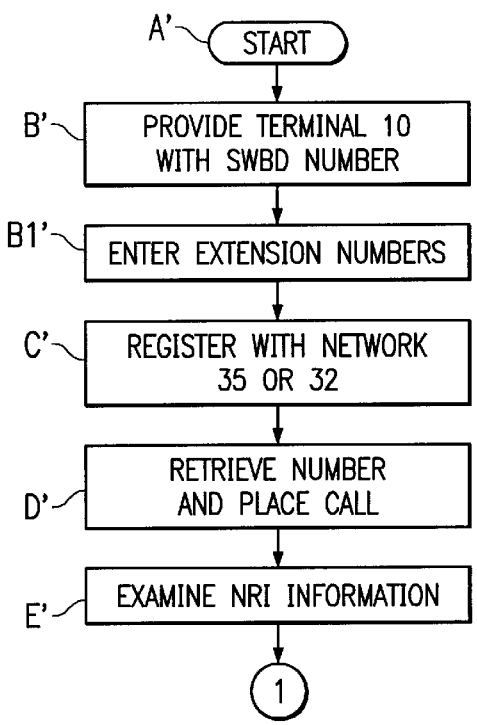
FIGS. 4a and 4b show a logic flow diagram that illustrates a method in accordance with another embodiment of the invention.
Figure 4B:
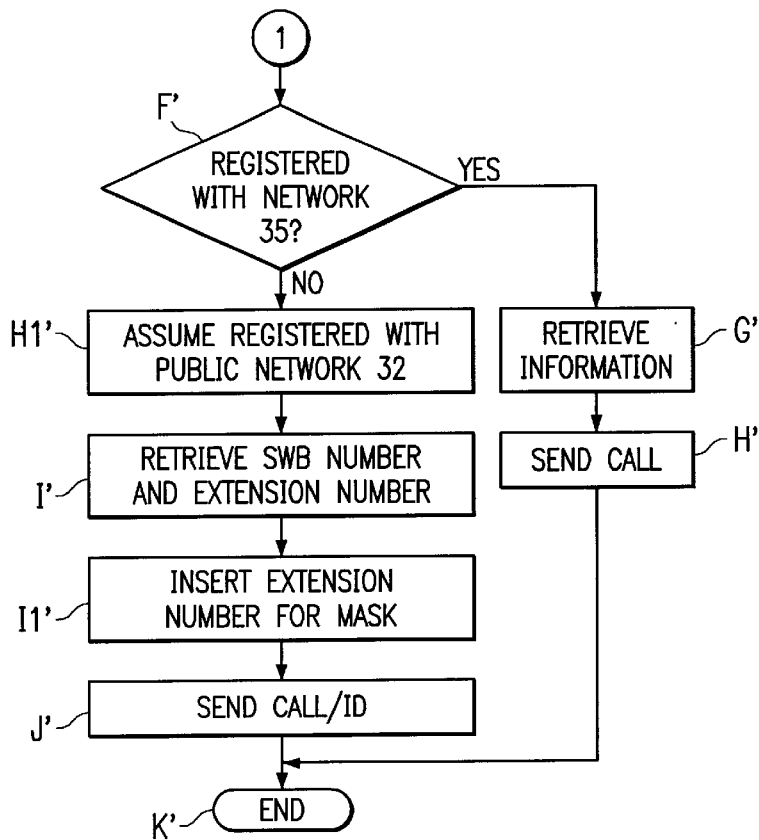

A method in accordance with this embodiment of the invention will now be described, with reference to FIGS. 4a and 4b. The method enables the user of mobile terminal 10 to place calls to a telephone located within an autonomous network (such as network 35) by simply dialing an extension number for the telephone, regardless of whether the mobile terminal 10 is registered with the autonomous network or a public network. In the following description of the method in accordance with this embodiment of the invention, it is assumed that the user of the mobile terminal 10 desires to place a call with one of the telephones 31b located within the autonomous network 35. For the purposes of this description, this telephone is also referred to as "destination telephone 31b".

At block A' the method is started. At block B' the mobile terminal 10 is provided with the SWBD# information. By example, in accordance with one embodiment of the invention, the step of block B may be performed by the user defining values for the code portions 40a", 42', and 44' of the SWBD# information. For example, by operating the keypad 22 the user may cause the mobile terminal 10 to enter a menu function which prompts the user (via the display 20) to specify values for selected ones of the code portions 40a", 42', and 44'. Thereafter, the user may operate the keypad 22 so as store desired values for one or more selected ones of these code portions 40a", 42', and 44' in memory portion 24a".

Some time later it is assumed that the user operates the keypad 22 so as to enter one or more selected extension numbers and associated descriptive text into the controller 18 (block B1'). Preferably, these extension numbers include four digits, although in other embodiments, other suitable numbers of digits may be employed. An example of an extension number entered into the mobile terminal 10 by the user at block B1 includes '1111'. Also by example, the associated descriptive text entered by the user for the number '1111' may specify "telephone 31b". The controller 18 then responds by storing the extension number(s) and associated text in the memory portion 24b' (block B1').

Some time later it is assumed that the mobile terminal 10 becomes registered with either the autonomous network 35 or the public network 32, and, as a result, the controller 18 updates the NRI information to reflect that the mobile terminal 10 is registered with this network (block C'). The manner in which the mobile terminal 10 registers with the autonomous network 35 may be in accordance with, by example, section 6.3.14 of IS-136.1, Rev. A, or later revisions thereof, and the manner in which the mobile terminal 10 registers with the public network 32 may be in accordance with, by example, section 6.3.7 of IS-136.1, Rev. A, or later revisions thereof.

Thereafter, at block D' it is assumed that the user operates the keypad 22 so as to cause one of the extension numbers from the memory portion 24b' to be retrieved into the memory portion 24d' (i.e., the memory buffer), and to specify that a call be placed with a destination telephone corresponding to the retrieved extension number. By example, after retrieving the extension number, the user may specify that the call be made to the destination telephone 31b by depressing the 'SEND' key of keypad 22.

It should be noted that it is also within the scope of this invention for the user to enter the extension number into the mobile terminal 10 at block D' by operation of the keypad 22, rather than by operating the keypad 22 so as to retrieve the extension number from the memory portion 24b'. It is further within the scope of this invention for the user to retrieve the telephone number at block D' from a portion of the memory 24 wherein SMS messages received by the terminal 10 are stored. That is, it is within the scope of this invention that the telephone number retrieved at block D' is one which was previously received by the mobile terminal 10 in a SMS message transmitted from one of the networks 32, 35, or 37.

After the step of block D' is performed, the controller 18 examines the stored NRI information to identify the network (i.e., network 32 or 35) with which the mobile terminal 10 is presently registered (block E'). Assuming that the NRI information indicates that the mobile terminal 10 is registered with the autonomous network 35 ('Y' at block F'), then at block G' the mobile terminal 10 retrieves the extension number for the destination telephone 31b from the memory portion 24d' (i.e., the memory buffer) (this is the extension number previously retrieved at block D'). In one embodiment of this invention, assuming that the mobile terminal 10 and the various components of the autonomous network 35 have a caller identification capability, then at block G' the mobile terminal 10 also retrieves the extension number for the mobile terminal 10 from the memory portion 24c'. The mobile terminal 10 then transmits a call signal, including the numbers retrieved at block G', to the network 35 (block H'), wherein the signal is then forwarded to the destination telephone 31b by way of the base station 31 and the PBX 31a. Control then passes to block K' where the method is terminated. The call signal transmitted at block H' may have a format in accordance with, by example, section 6.4.4.7 (Origination) of IS-136.1, Rev. A, or later revisions thereof, and the number for the mobile terminal 10 retrieved at block G' may have a format in accordance with, by example, a 'Calling Party Number' information element defined in IS-136, such as that defined in section 6.4.4.7 (Origination) of IS-136.1, Rev. A, or later revisions thereof.

In accordance with another embodiment of the invention, the mobile terminal 10 does not retrieve the extension number for the mobile terminal 10 from the memory portion 24c' at block G', and thus this number is not included in the call signal transmitted at block H'. In this embodiment, at block H' the mobile terminal 10 transmits a call signal, including the user-specified telephone number to the network 35 at block H', wherein the signal is then forwarded to the PBX 31a by way of the base station 31. The call signal transmitted at block H' may have a format in accordance with, by example, section 6.4.4.7 (Origination) of IS-136.1, Rev. A, or later revisions thereof. It is assumed that the call signal includes information that identifies the mobile terminal 10, and that this information is recognizable by the PBX 31a as identifying the mobile terminal 10. By example, this information may include Mobile Station Identification (MSID) information as defined in Section 8.1 of IS-136, Rev. A, or later revisions thereof. In response to receiving the call signal, the PBX 31a retrieves the information identifying the mobile terminal 10 from the signal and, based on this information, retrieves the Calling ID# for the mobile terminal 10 from the storage device 33b. The PBX 31a then includes the Calling ID# in the call signal, and forwards the signal to the destination telephone 31b. Control then passes to block K' where the method is terminated.

If 'no' at block F', and assuming that the controller 18 determines that the NRI information indicates that the mobile terminal 10 is registered with the public network 32 (block H1'), then the controller 18 retrieves the extension number from memory portion 24d' (the memory buffer), and also retrieves the SWBD# information from the memory portion 24a (block I'). Then, at block I1' the controller 18 inserts the extension number retrieved at block I' into the portion 40b' of the SWBD# information retrieved at block I' to form a telephone number for the destination telephone 31b. By example, assuming that the retrieved SWBD# information includes codes similar to those shown in blocks 44', 42', and 40a" of FIG. 8, and that the extension number retrieved at block I' includes '5555', then the resulting telephone number formed at block I1' is similar to the one shown in FIG. 9. Thereafter, at block J' the mobile terminal 10 sends a call signal, including the telephone number formed at block I', to the network 32, and the network 32 then forwards the call signal to the destination telephone 31b, via the PSTN 32a and the PBX 31a. After the step indicated by block H' is performed, the method is terminated at block K'.

In accordance with one embodiment of the invention, at block I' the controller 18 also retrieves the telephone number (i.e., the number including the pre-extension digits as well as the extension number; e.g., calling1 ID#) for the mobile terminal 10 from memory portion 24c', and the call signal transmitted from the mobile terminal 10 at block J' also includes this retrieved telephone number. The call signal transmitted at block J' may have a format in accordance with, by example, section 6.4.4.7 (Origination) of IS-136.1, Rev. A, or later revisions thereof, and the telephone number for the mobile terminal 10 retrieved at block I' may have a format in accordance with, by example, a 'Calling Party Number' information element defined in IS-136, such as that defined in section 6.4.4.7 (Origination) of IS-136.1, Rev. A, or later revisions thereof.

In accordance with another embodiment of the invention, caller identification is provided by way of the public network 32. By example, in this embodiment of the invention, it is assumed that the method is performed in a similar manner as was described above so that the mobile terminal 10 registers with the public network 32 at block F', and the steps indicated by blocks I', I1', and J' are performed. As a result, the call signal is transmitted to the public network 32 at block J', and the signal is forwarded to the MSC 34a by way of the base station 30. The call signal transmitted at block J' may have a format in accordance with, by example, section 6.4.4.7 (Origination) of IS-136.1, Rev. A, or later revisions thereof. It is assumed that the call signal includes information that identifies the mobile terminal 10, and that this information is recognizable by the MSC 34a as identifying the mobile terminal 10. By example, this information may include Mobile Station Identification (MSID) information as defined in Section 8.1 of IS-136, Rev. A, or later revisions thereof. In response to receiving the call signal, the MSC 34a retrieves the information identifying the mobile terminal 10 from the signal and, based on this information, retrieves the Calling1 ID# for the mobile terminal 10 from the storage device 34b. The MSC 34a then includes the Calling1 ID# in the call signal, and forwards the signal to the destination telephone by way of the PSTN 32a. Control then passes to block K' where the method is terminated.

It should be noted that although described in the context of the SWBD# information including codes similar to those shown in FIG. 8, and in the context of the extension numbers having four digits, it is not intended that the invention be so limited. By example, it is also within the scope of this invention that part of the first code portion 40a" of the SWBD# information be masked, in addition to the second code portion 40b' of the telephone number. This can be seen in view of FIG. 10a, which shows first code portion 43 and second code portion 40b' of the SWBD# information in accordance with another embodiment of the invention. In accordance with this embodiment of the invention, a component 43b of the first code portion 43 is masked, in addition to the code portion 40b'. Preferably the component 43b includes only a single digit. Another component 43a of the first code portion 43 is not masked, and includes digits. Also in this embodiment of the invention, the extension numbers stored in memory portions 24b' and 24c' preferably include five digits. As such, for this embodiment of the invention, the steps shown in FIGS. 4a and 4b are performed in a similar manner as was described above, except that the extension number retrieved at block I' is assumed to include five digits, such as '3-5555', the code retrieved at block I' is assumed to be similar to the one shown in FIG. 10a, and the performance of the step identified by block I1' is assumed to result in the formation of a telephone number '123-5555' (shown in FIG. 10b and identified by label "45").

In still another embodiment of the invention, the SWBD# information has a format that includes codes 60-64 as are shown in FIG. 12a, wherein these codes include digits. Also, the extension numbers stored in memory portions 24b' and 24c' preferably have a format that includes codes 66 and 68 similar to those (e.g., having five digits) shown in FIG. 12b. In accordance with this embodiment of the invention, the steps shown in FIGS. 4a and 4b are performed in a similar manner as was described above, except that the extension number retrieved at block I' is assumed to include five digits, such as '8-9999', the code retrieved at block I' is assumed to have a similar format as the one shown in FIG. 12a, and the step identified by block I1' is performed by (1) parsing the extension number to remove code 66 therefrom, (2) parsing the SWBD# information to remove the code 64 therefrom, and (3) appending the code 68 of the extension number to the codes 60 and 62 of the SWBD# information to form a telephone number having the codes 60, 62, and 68, as shown in FIG. 12c. It should be noted that the digits shown in FIGS. 12a–12c are intended to be exemplary in nature and not limiting to the invention. Also, it should be noted that the number of codes shown in FIGS. 12a–12c is intended to be exemplary in nature and that other suitable codes may be employed. By example, the telephone number shown in FIG. 12a (and the resultant number shown in FIG. 12c) may also include a long distance code and a country code where appropriate. Also by example, the extension number shown in FIG. 12b may include code 68 only. In this case, the step identified by block I1' is performed by parsing only the SWBD# information to remove the code 64 therefrom, and by appending the code 68 of the extension number to the codes 60 and 62 of the SWBD# information to form the telephone number shown in FIG. 12c. It should also be noted that the step of block D' may be performed by the user operating the keypad 22 so as to enter into the memory portion 24d' (i.e., the memory buffer) of the mobile terminal 10 a number such as the one shown in FIG. 12a, followed by an extension number such as the one shown in FIG. 12b. By example, the user may enter into the terminal 10 a number '333-123-4567-8-9999'. In this case, the steps following block D' are performed in a similar manner as was described above, except that at block I' the controller 18 retrieves the entered number '333-123-4567-8-9999'. Also, after block I' is performed, the controller 18 may respond by determining whether the entered number includes a predetermined number of digits, such as ten, eleven, or twelve digits. For a case where the controller 18 determines that the entered number includes more than the predetermined number of digits, the controller 18 may then parse the entered number so as remove selected ones of the digits therefrom. By example, the parsing step may be performed so as to separate a front or left-most portion (including a first predetermined number of digits, such as six digits) from the entered number, and a rear or left-most portion (including a second predetermined number of digits, such as four digits) from the entered number. For this example, the parsing step results in the portions specifying '333-123' and '9999' being removed from the entered number. Thereafter, at block I1' the portion specifying '9999' is appended to the portion specifying '333-123' so as to form the number shown in FIG. 12c.

Figure 1D:
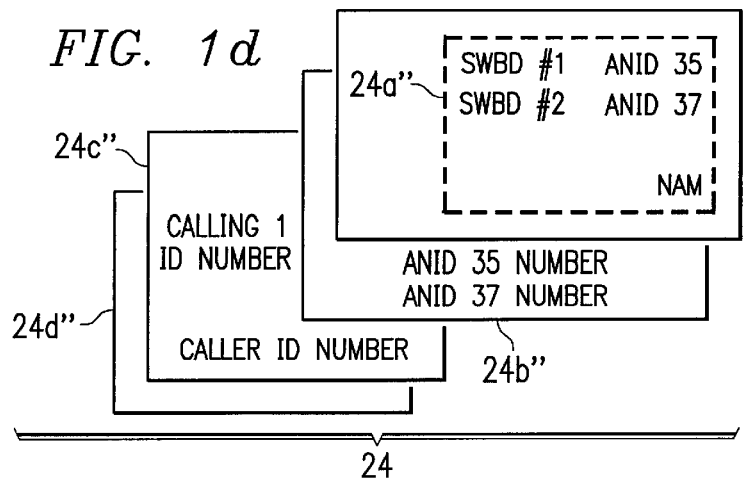
FIG. 1d shows the memory 24 of the mobile terminal of FIG. 1a in accordance with a further embodiment of the invention.

A method in accordance with another embodiment of the invention will now be described. In accordance with this embodiment of the invention, the memory 24 of the mobile terminal 10 includes memory portions 24a"–24d", which are shown in FIG. 1d.

Memory portion 24a" stores information identified as "SWBD#1", "SWBD#2", "ANID35", and "ANID37". The SWBD#1 information includes code portions corresponding to the autonomous network 35, and the SWBD#2 information includes code portions corresponding to the autonomous network 37. The SWBD#1 information preferably includes code portions similar to those shown in FIG. 8, although different digits may be employed than the ones shown in blocks 44', 42', and 40a". The SWBD#2 information preferably includes code portions 50b', 50a", 52', and 54' (see, e.g., FIG. 11), although different digits may be employed than the ones shown in blocks 54', 52', and 50a". The code portions 54', 52', and 50a" are similar in format to code portions 40b', 40a", 42', and 44', respectively, of FIG. 8. Code portion 50a" preferably includes a code for accessing a switch within autonomous network 37, and represents a first portion of a pre-assigned telephone access code for telephones located within the autonomous network 37. By example, it is assumed that the first portion 50a" specifies a code '222' for accessing a PBX (not shown) of the autonomous network 37, and also corresponds to a first portion of pre-assigned telephone codes (e.g., 222-5555,222-5556, 222-5557, etc.) for the telephones (not shown) located within this network 37. The second portion 50b' preferably includes a mask, wherein extension numbers for selected ones of the telephones within network 37 may be inserted in accordance with this invention in order to enable a call to be placed to these telephones during times when the mobile terminal 10 is not registered with the network 37, as will be described below.

As was described above, memory portion 24a" also stores information identified as "ANID35" and "ANID37". The ANID35 information identifies the autonomous network 35 and the ANID37 information identifies the autonomous network 37. By example, the ANID35 and ANID37 information may specify the Private Operating Frequency (POF) of the respective networks 35 and 37 (see, e.g., section 6.3.21 of IS-136.1, Rev. A, or later revisions thereof), the Private System Identification (PSID) of the respective networks 35 and 37 (see, e.g., section 8.3.4 of IS-136.1, Rev. A, or later revisions thereof), or the Residential System Identification (RSID) of the respective networks 35 and 37 (see, e.g., section 8.3.5 of IS-136.1, Rev. A, or later revisions thereof).

The values of the code portions 40a", 42', and 44' of SWBD#1, and the values of code portions 50a", 52', and 54' of SWBD#2, may be prestored in memory portion 24a" along with the respective ANID35 and ANID37 information, or may be specified by the user in a manner as will be described below. In accordance with one embodiment of the invention, the SWBD#1 information, the SWBD#2 information, and the corresponding ANID35 and ANID37 information, is stored as part of the NAM, and the NAM is included in the memory portion 24a".

It should be noted that although this embodiment of the invention is described in the context of memory portion 24a" storing SWBD#1 and SWBD#2 corresponding to the autonomous networks 35 and 37, it should be noted that it is not intended that the invention be so limited, and that similar types of information for other autonomous networks may also be stored in the memory portion 24a".

As for the memory portion 24b' described above, the memory portion 24b" stores a directory of telephone numbers and associated descriptive text. The telephone numbers may be specified, and later retrieved, by the user using keypad 22. The telephone numbers preferably include extension numbers for telephones located within one or more autonomous networks, such as networks 35 and/or 37. In addition, the memory portion 24b" also preferably stores the ANID35 and ANID37 information identifying the respective networks 35 and 37. This information is associated with the extension numbers for respective ones of the networks 35 and 37. More particularly, the extension numbers for telephones within the network 35 correspond to ANID35 information stored in memory portion 24b", and the extension numbers for telephones within the network 37 correspond to ANID37 information stored in memory portion 24b".

Each extension number stored in memory portion 24b" preferably includes a predetermined number of digits, in particular, four digits, although in other embodiments, other appropriate numbers of digits may be employed.

The memory portions 24c"-24d" are similar to the memory portions 24c'-24d', respectively, described above, and store similar information as the respective memory portions 24c'-24d'.

Figure 5A:
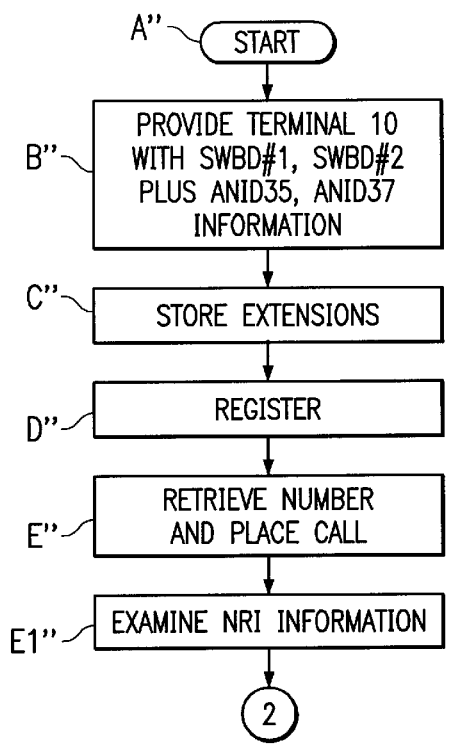
FIGS. 5a and 5b show a logic flow diagram that illustrates a method in accordance with another embodiment of the invention.
Figure 5B:
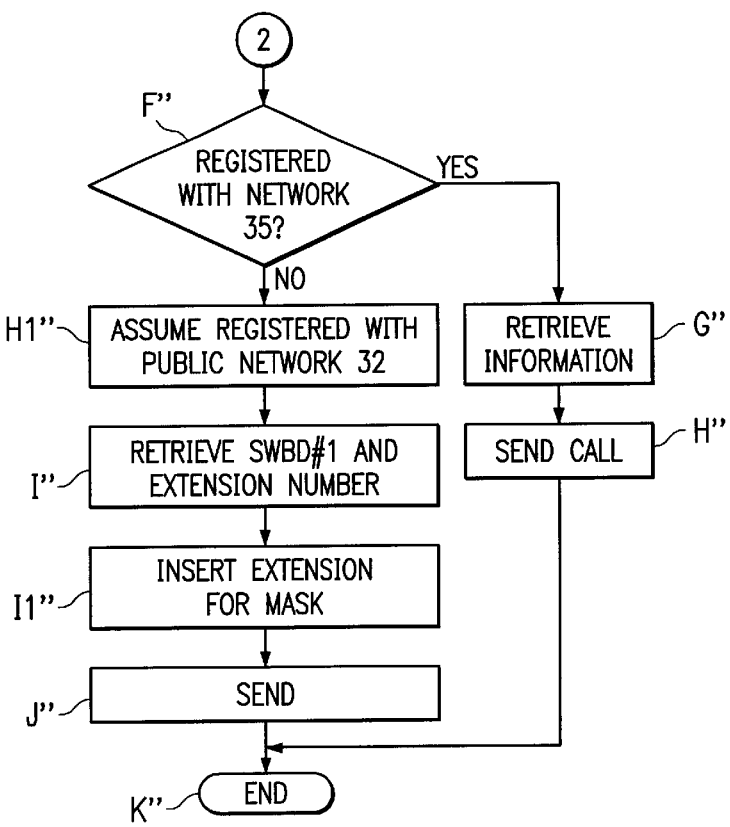

The method in accordance with this embodiment of the invention will now be described, with reference to FIGS. 5a and 5b. At block A" the method is started. At block B" the mobile terminal 10 is provided with the SWBD#1 information, the associated ANID35 information, the SWBD#2 information, and the associated ANID37 information.

As was previously described, in accordance with one embodiment of the invention, the step of block B" may be performed by the user defining values for the code portions 40a", 42', and 44' of SWBD#1, and values for the code portions 50a", 52', and 54' of SWBD#2. For example, by operating the keypad 22 the user may cause the mobile terminal 10 to enter a menu function which prompts the user (via the display 20) to specify values for selected ones of the code portions 40a", 42', 44', 50a", 52', and 54'. Thereafter, the user may operate the keypad 22 so as store these values for the selected code portions in memory portion 24a".

Some time later it is assumed that the user operates the keypad 22 so as to enter one or more of the extension numbers and associated descriptive text into the controller 18 of the mobile terminal 10. By example, an extension number entered into the mobile terminal 10 by the user may include the digits '1111'. Also by example, the associated descriptive text entered by the user for the number '1111' may specify "telephone 31b". The controller 18 then responds by storing the number(s) and associated text in the memory portion 24b" (block C"). In accordance with this invention, selected ones of the extension numbers may be retrieved by the user for placing a call to a destination telephone, as will be further described below.

Some time later it is assumed that the mobile terminal 10 becomes registered with either one of the networks 32, 35, or 37, and the controller 18 updates the NRI information so as to indicate the network with which the mobile terminal 10 becomes registered (block D").

Thereafter, at block E" it is assumed that the user operates the keypad 22 so as to cause one of the extension numbers from the memory portion 24b' to be retrieved into the memory portion 24d" (i.e., the memory buffer), and to specify that a call be placed with a destination telephone corresponding to the retrieved extension number. By example, after retrieving the extension number, the user may specify that the call be made to the destination telephone by depressing the 'SEND' key of keypad 22.

For the purposes of this description, it is assumed that the extension number retrieved by the user at block E" corresponds to a telephone 31b located within the autonomous network 35.

It should be noted that it is also within the scope of this invention for the user to enter the extension number into the mobile terminal 10 at block E" by operation of the keypad 22, rather than retrieving the extension number from memory portion 24b". It is further within the scope of this invention for the user to retrieve the telephone number at block E" from a portion of the memory 24 wherein SMS messages received by the terminal 10 are stored. That is, it is within the scope of this invention that the telephone number retrieved at block E" is one which was previously received by the mobile terminal 10 in a SMS message transmitted from one of the networks 32, 35, or 37.

After the step of block E" is performed, the controller 18 examines the NRI information stored in the memory 24 to identify the network (i.e., network 32, 35, or 37) with which the mobile terminal 10 is presently registered (block E1"). Assuming that the NRI information indicates that the mobile terminal 10 is registered with the autonomous network 35 ('Y' at block F"), then at block G" the mobile terminal 10 retrieves the extension number for the destination telephone from the memory portion 24d' (i.e., the memory buffer). The mobile terminal 10 then transmits a call signal, including the number retrieved at block G", to the network 35 (block H"), wherein the signal is then forwarded to the destination telephone 31b by way of the base station 31 and the PBX 31a. Control then passes to block K" where the method is terminated.

In one embodiment of this invention, assuming that the mobile terminal 10 and the various components of the autonomous network 35 have a caller identification capability, then at block G" the mobile terminal 10 also retrieves the extension number for the mobile terminal 10 from the memory portion 24c". The mobile terminal 10 then transmits a call signal, including the numbers retrieved at block G", to the network 35 (block H"), wherein the signal is then forwarded to the destination telephone 31b by way of the base station 31 and the PBX 31a. Control then passes to block K" where the method is terminated. The call signal transmitted at block H" may have a format in accordance with, by example, section 6.4.4.7 (Origination) of IS-136.1, Rev. A, or later revisions thereof, and the number for the mobile terminal 10 retrieved at block G" may have a format in accordance with, by example, a 'Calling Party Number' information element defined in IS-136, including that defined in section 6.4.4.7 (Origination) of IS-136.1, Rev. A, or later revisions thereof.

In accordance with another embodiment of the invention, the mobile terminal 10 does not retrieve the extension number for the mobile terminal 10 from the memory portion 24ac" at block G", and thus this number is not included in the call signal transmitted at block H". In this embodiment, at block H" the mobile terminal 10 transmits a call signal, including the user-specified number (retrieved at block G"), to the network 35 (block H"), wherein the signal is then forwarded to the PBX 31a by way of the base station 31. The call signal transmitted at block H" may have a format in accordance with, by example, section 6.4.4.7 (Origination) of IS-136.1, Rev. A, or later revisions thereof. It is assumed that the call signal includes information that identifies the mobile terminal 10, and that this information is recognizable by the PBX 31a as identifying the mobile terminal 10. By example, this information may include Mobile Station Identification information (MSID) such as that defined in Section 8.1 of IS-136, Rev. A, or later revisions thereof. In response to receiving the call signal, the PBX 31a extracts the information identifying the mobile terminal 10 from the signal and, based on this information, retrieves the Calling ID# for the mobile terminal 10 from the storage device 33b. The PBX 31a then includes the Calling ID# in the call signal, and forwards the signal to the destination telephone 31b. Control then passes to block K" where the method is terminated.

Referring again to FIG. 5b, a case where the controller 18 determines at block F" that the mobile terminal 10 is not registered with an autonomous network will now be described. If 'no' at block F", and assuming that the controller 1.8 determines that the NRI information indicates that the mobile terminal 10 is registered with the public network 32 (block H1"), then the controller 18 retrieves the extension number from memory portion 24d" (the memory buffer), and also retrieves the SWBD#1 information from the memory portion 24a" (block I"). The manner in which the controller 18 recognizes that the SWDB#1 information needs to be retrieved at block I" (versus the SWBD#2 information) may be in accordance with various embodiments of the invention, and will be described further below.

After the step of block I" is performed, then at block I1" the controller 18 inserts the extension number retrieved at block I" into the portion 40b' of the SWBD#1 information retrieved at block I" to form a telephone number for the destination telephone 31b. By example, assuming that the retrieved SWBD#1 information includes codes similar to those shown in blocks 44', 42', and 40a" of FIG. 8, and that the extension number retrieved at block I" includes '5555', then the telephone number formed at block I1" is similar to the one shown in FIG. 9. In this manner, a telephone number having a modified format relative to the format of the extension number is formed. Thereafter, at block J" the mobile terminal 10 sends a call signal, including the telephone number formed at block I", to the network 32, and the network 32 then forwards the call signal to the destination telephone corresponding to the telephone number. After the step indicated by block H" is performed, the method is terminated at block K".

In accordance with another embodiment of the invention, caller identification is provided by way of the public network 32, in a similar manner as described above. By example, in this embodiment of the invention, it is assumed that the method is performed in a similar manner as was described above so that the mobile terminal 10 registers with the public network 32 at block F", and the steps indicated by blocks I", I1", and J" are performed. As a result, the call signal is transmitted to the public network 32 at block J", and the signal is forwarded to the MSC 34a by way of the base station 30. The call signal transmitted at block J" may have a format in accordance with, by example, section 6.4.4.7 (Origination) of IS-136.1, Rev. A, or later revisions thereof. It is assumed that the call signal includes information that identifies the mobile terminal 10, and that this information is recognizable by the MSC 34a as identifying the mobile terminal 10. By example, this information may include a Mobile Station Identification information (MSID) as defined in Section 8.1 of IS-136, Rev. A, or later revisions thereof. In response to receiving the call signal, the MSC 34a retrieves the information identifying the mobile terminal 10 from the signal and, based on this information, retrieves the Calling1 ID# for the mobile terminal 10 from the storage device 34b. The MSC 34a then includes the Calling1 ID# in the call signal, and forwards the signal to the destination telephone by way of the PSTN 32a. Control then passes to block K" where the method is terminated.

In still another embodiment of the invention, the SWBD#1 information includes codes 60–64 as are shown in FIG. 12a, wherein these codes include digits. Also, the extension numbers stored in memory portions 24b" and 24ac" preferably include codes 66 and 68 (having, e.g., five digits) as are shown in FIG. 12b. In accordance with this embodiment of the invention, and assuming that the performance of block F" results in control passing to block H1", then the steps shown in FIGS. 5a and 5b are performed in a similar manner as was described above, except that the extension number retrieved at block I" is assumed to include five digits, such as '8-9999', the code of the SWBD#1 information retrieved at block I" is assumed to be similar to the one shown in FIG. 12a, and the step identified by block I1" is performed by (1) parsing the extension number to remove code 66 therefrom, (2) parsing the SWBD#1 information to remove the code 64 therefrom, and (3) appending the code 68 of the extension number to the codes 60 and 62 of the SWBD#1 information to form a telephone number having the codes 60, 62, and 68, as shown in FIG. 12c. It should be noted that the digits shown in FIGS. 12a–12c are intended to be exemplary in nature and not limiting to the invention. Also, it should be noted that the number of codes shown in FIGS. 12a–12c is intended to be exemplary in nature and that other suitable codes may be employed. By example, the telephone number shown in FIG. 12a (and the resultant number shown in FIG. 12c) may also include a long distance code and a country code where appropriate. Also by example, the extension number shown in FIG. 12b may include code 68 only. In this case, the step identified by block I1" is performed by parsing only the SWBD#1 information to remove the code 64 therefrom, and by appending the code 68 of the extension number to the codes 60 and 62 of the SWBD#1 information to form the telephone number shown in FIG. 12c. It should further be noted that the step of block E" may be performed by the user operating the keypad 22 so as to enter into the memory portion 24d" (i.e., the memory buffer) of the mobile terminal 10 a number such as the one shown in FIG. 12a, followed by an extension number such as the one shown in FIG. 12b. By example, the user may enter into the terminal 10 a number '333-1234567-8-9999'. In this case, the steps following block E" are performed in a similar manner as was described above, except that at block I" the controller 18 retrieves the entered number '333-1234567-8-9999'. Also, after block I" is performed, the controller 18 ma y respond by determining whether the entered number includes a predetermined number of digits, such as ten, eleven, or twelve digits. For a case where the controller 18 determines that the entered number includes at least the predetermined number of digits, the controller 18 may then parse the entered number so as remove selected ones of the digits therefrom. By example, the parsing step may be performed so as to separate a front portion (including a first predetermined number of digits, such as six digits) from the entered number, and a rear portion (including a second predetermined number of digits, such as four digits) from the entered number. By example, the parsing step results in the portions specifying '333-123' and '9999' being removed from the entered number. Thereafter, at block I1" the portion specifying '9999' is appended to the portion specifying '333-123' so as to form the number shown in FIG. 12c.

As was previously described, the controller 18 recognizes that the SWDB#1 information needs to be retrieved at block I" in accordance with various embodiments of the invention. By example, in accordance with one embodiment, the SWBD#1 information and the SWBD#2 information may have differently formatted extension codes (e.g., digit spaces). For example, the SWBD#1 formation may have a four digit extension code and the SWBD#2 information may have a five digit extension code. In this case, after retrieving the extension number at block I", the controller 18 performs a step o f comparing this extension number to the extension codes of the SWBD#1 and SWBD#2 information to determine which information has an extension code of similar format (i.e., length or number of digits) as the retrieved extension number. Assuming that the controller 18 determines that the SWBD#1 information has an extension code of similar format as the retrieved extension number (e.g., both include four digits), then the SWBD#1 information is also retrieved at block I", and the method proceeds to block I1" and continues in the manner described above.

In accordance with another embodiment of the invention, it is assumed that the memory 24 stores first information defining a predetermined range of extension numbers (e.g., 1000–5000) corresponding to the SWBD#1 information and second information defining another predetermined range of extension numbers (e.g., 5001–9999) corresponding to the SWBD#2 in formation. In this embodiment, after retrieving the extension number previously entered/retrieved by the user (block I"), the controller 18 compares this number to the first and second information to determine whether or not the extension number falls within one of the ranges defined by the first and second information. Assuming that the controller 18 determines that the extension number falls within the range defined by the first information, then the controller 18 responds by retrieving the SWDB#1 information corresponding to the first information (block I"), and the method proceeds to block I1" and continues in the manner described above.

In accordance with another embodiment of the invention, it is assumed that the memory portion 24a" stores respective index information corresponding to the respective SWBD#1 information and SWBD#2 information. By example, this index information may include a value '1' for the SWBD#1 information and a value '2' for the SWBD#2 information. As another example, this information may be the ANID 35 and ANID 37 information for the respective SWBD#1 information and SWBD#2 information.

In this embodiment, the user can specify which one of the SWBD#1 and SWBD#2 in formation shall be retrieved by entering the index information into the mobile terminal 10 along with the extension number at block E". By example, the user may enter '1-1111' where '1' represents the index information corresponding to the SWBD#1 information, and '1111' represents the user-entered extension number. Also by example, the user may enter '2-1111' where '2' represents the index information corresponding to the SWBD#2 information, and '1111' represents the user-entered extension number. Thereafter, the method is performed in a similar manner as described above, except that at block I" the controller 18 retrieves the index information in addition to the extension number, and then compares the index information to that stored in memory portion 24a" to determine whether or not the compared information is similar. Assuming that the index information corresponds to that associated with the SWBD#1 information stored in memory portion 24a", then the controller 18 retrieves the SWBD#1 information from memory portion 24a", and the method proceeds to block I1" and continues in the manner described above. It should be noted that the index information may be pre-stored along with the extension numbers in memory portion 24b", prior to retrieval. By example, the index information may be the ANID 35 and ANID 37 information stored in memory portion 24b". In this case, index information and an associated extension number may be retrieved from memory portion 24b" by the user at block E", rather than being entered into the terminal 10 via the keypad 22.

In accordance with another embodiment of the invention, the controller 18 retrieves either the SWBD#1 or SWBD#2 information at block I" depending on which public network the mobile terminal 10 is registered with. By example, the mobile terminal 10 may have a capability for retrieving the SWBD#1 information from the memory portion 24a" in cases where it is determined at block F''' that the terminal 10 is registered with the public network 32, and a capability for retrieving the SWBD#2 information from the memory portion 24a" in cases where it is determined at block F''' that the terminal 10 is registered with another predetermined public network. As an example, in addition to the ANID35 and associated SWBD#1 information stored in memory portion 24a", the memory portion 24a" may also store information identifying the network 32. This information may include, by example, a System Identification Information (SID) for the network 32, as is defined in section 8.3 of IS-136, Rev. A, or later revisions thereof. Assuming that at block F''' the controller 18 determines that the mobile terminal 10 is registered with the public network 32, then at block I" the controller 18 retrieves the SWBD#1 information associated with the information identifying the network 32 from memory portion 24a", in addition to retrieving the extension number. Control then passes to block I1" where the method continues in the manner described above.

In accordance with a further embodiment, the mobile terminal 10 may prompt the user for selecting the SWBD#1 information or the SWBD#2 information. By example, after the performance of block H1" the controller 18 of the mobile terminal 10 may respond by presenting to the user, via the display 20, an option for selecting one of the SWBD#1 information or the SWBD#2 information. Thereafter, the user may operate the keypad 22 so as to select either the SWBD#1 information or the SWBD#2 information. Assuming that the user selects the SWBD#1 information (block I"), then the controller 18 responds by retrieving the SWBD#1 information from the memory portion 24a", and the steps indicated by blocks I1", J", and K" are performed in a similar manner as was described above.

A method in accordance with a further embodiment of the invention will now be described. In this embodiment of the invention, the memory 24 of the mobile terminal 10 includes similar memory portions 24a"–24d" as described above (and shown in FIG. 1d), except that it is assumed that the telephone numbers stored in the directory of memory portion 24b" include non-extension numbers as well as extension numbers. More particularly, it is assumed that the memory portion 24b" stores extension numbers for destination telephones within one or more of the autonomous networks 35 and 37, and one or more non-extension telephone numbers having seven or more digits for destination telephones within one or more of the networks 32, 35, and 37. By example, each of the extension numbers may include a four or five digit code (e.g., a code such as '3-5555' or '5555'). Also by example, the non-extension telephone numbers may include seven digit telephone numbers such as a pre-assigned telephone code (e.g., 333-5555), eleven digit telephone numbers such as, by example, 1-203-333-5555, wherein the numbers "203" represent an area code and the number "1" represents a long distance code, and/or telephone numbers having greater numbers of digits (e.g., country codes, etc).

Also, in this embodiment of the invention, the memory 31' of the base station 31 is assumed to store similar telephone numbers for the telephones 31b within the autonomous network 35 as are stored in the memory portion 24b" of the mobile terminal 10. That is, the memory 31' is assumed to store telephone numbers which are duplicates of those numbers from memory portion 24b" corresponding to telephones 31b within the network 35. Also, the memory 31' is assumed to store an extra-network dialing code (such as, e.g., '9') for the network 35.

A method in accordance with this embodiment of the invention will now be described, with reference to FIGS. 6a and 6b. At block A1' the method is started. At block A2' the mobile terminal 10 registers with one of the networks 32, 35, or 37. For the purposes of this description, it is assumed that the mobile terminal 10 registers with the autonomous network 35 at block A2'. Some time later it is assumed that the user operates the keypad 22 of the mobile terminal 10 so as to specify that a call be made to a telephone within one of the networks 32, 35, or 37 (block A3'). By example, the user may specify that the call be made by operating the keypad 22 so as to cause the controller 18 to retrieve a selected one of the telephone numbers from the directory of memory portion 24b" and store the retrieved telephone number in memory portion 24d" (i.e., the memory buffer). Then, the user may depress the 'SEND' key of the keypad 22. Also by example, the user may specify that the call be made by first operating the keypad 22 so as to enter a desired telephone number (e.g., a four or five digit number for a destination telephone located within the autonomous network 35 or a telephone number having more than seven digits for a destination telephone located within any one of the networks 32, 35, or 37) into the memory portion 24d". Then, the user may depress the 'SEND' key of the keypad 22. For either case, the controller 18 responds at block A4' by retrieving the telephone number from memory portion 24d". Also, assuming that the mobile terminal 10, the network 35, and the destination telephone 31b have a caller identification capability, the mobile terminal 10 also responds at block A4' by retrieving the telephone number of the mobile terminal 10 from memory portion 24c".

It should be noted that it is also within the scope of this invention for the telephone number retrieved at block A3' to include a telephone number previously received by the mobile terminal 10 in a SMS message, as was previously described.

After the step of block A4' is performed, at block A4" the mobile terminal 10 forwards a call signal, including the numbers previously retrieved at block A4', to the network with which the terminal 10 previously registered at block A2'. As was previously described, and for purposes of example only, this network is assumed to be the autonomous network 35.

At block A5' it is assumed that the base station 31 of the autonomous network 35 receives the call signal from the mobile terminal 10, and the signal is provided to the controller 31" of the base station 31b y way of the transceiver block 31a' of the base station 31. Then, at block A5", the controller 31" extracts the telephone number for the destination telephone from the received call signal. Thereafter, the controller 31' compares the extracted number to the numbers stored in the memory 31' to determine whether the extracted number is similar to any of the numbers stored in the memory 31' (block A6'). Preferably, this step is performed so that only the extension number portion of the extracted number is compared to the numbers stored in memory 31'. By example, assuming that the extracted telephone number has a format similar to that to FIG. 9, then the step of block A6' is performed by first parsing the number so as to extract portion 40b' therefrom, and by then comparing the extracted portion 40b' to the numbers stored in memory 31". Also by example, and assuming that the telephone number has a format similar to that to FIG. 10a, and the "X" values include digits, then the step of block A6' is performed by first parsing the number to extract portions 40b' and 43b therefrom, and by then comparing the extracted portions 40b' and 43b to the numbers stored in memory 31".

Also, the step of block A6' is preferably performed so as to take into account network feature codes that may be included in the extracted number. By example, assuming that the extracted number includes digits '88-1111', wherein '88' represents a feature code and '1111' represents an extension number for a destination telephone, then the comparison step is performed by comparing only the extension number portion '1111' to the numbers stored in memory 31'.

If yes at block A6', indicating that the destination telephone identified by the extracted telephone number is located within the autonomous network 35 (i.e., indicating that the call signal is to be forwarded to a telephone within the network 35), then the base station 31 responds by including (i.e., inserting) the extension number portion of the number in the call signal to produce a modified call signal (block A9'), wherein the modified call signal is assumed to not include the telephone number extracted previously at block A5". Then, at block A10' the base station 31 forwards the modified call signal to the destination telephone 31b identified by the extension number, by way of the PBX 31a. At block A11' the method is then terminated.

If no at block A6', indicating that the call signal is to be forwarded to a destination telephone that is not operating within the autonomous network 35 (e.g., the telephone number may have more digits (such as '214-111-1111') than an extension number or less digits (such as '611' or '911') than the extension number), then the controller 31" responds by retrieving the extra-network dialing code from the memory 31' and by appending the retrieved extra-network dialing code to the telephone number extracted previously at block A5" (block A7'). Preferably this step is performed by appending the extra-network dialing code as a prefix to the telephone number extracted previously at block A5". By example, assuming that the extra-network dialing code includes '1' and that the telephone number extracted previously at block A5" includes '1-203-123-5555', then the step identified by block A7' results in the formation of a number having a format '1-1-203-123-5555'. Thereafter, the controller 31" inserts the newly-formed number (i.e., including the extra-network dialing code and the telephone number extracted previously at block A5")) into the call signal to produce another modified version of the call signal, and the base station 31 operates in conjunction with the PBX 31a to forward this modified call signal to the destination telephone located outside of the network 35 (block A8'). Thereafter, at block A11' the method is terminated.

Figure 6A:
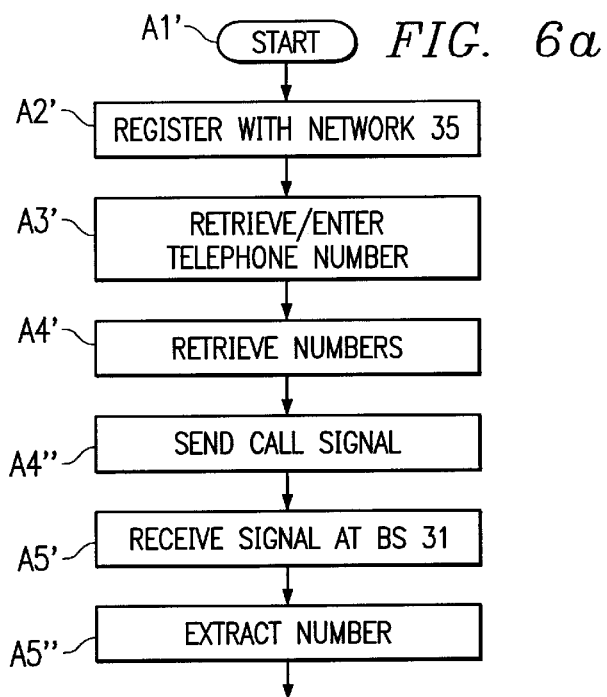
FIGS. 6a and 6b show a logic flow diagram that illustrates a method in accordance with a further embodiment of the invention.
Figure 6B:
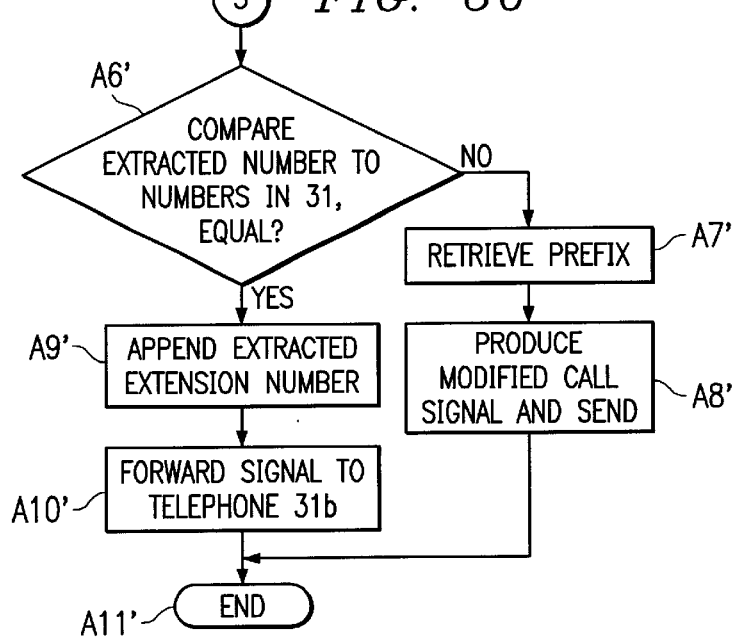
Figure 7:
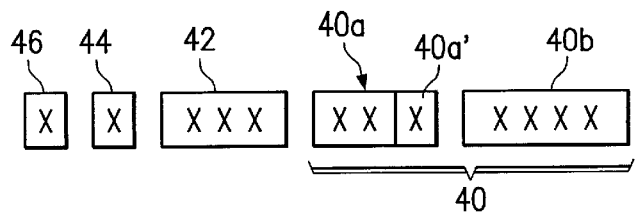
FIG. 7 shows an exemplary representation of various code portions of a telephone number, including a pre-assigned telephone code portion 40, an area code portion 42, a long distance code portion 44, and an extra-network dialing code portion 46.

In view of the foregoing description of the method of FIGS. 6a and 6b, it can be appreciated that the base station 31 determines whether a call signal received from the mobile terminal 10 is intended to be delivered to a telephone 31b operating within the autonomous network 35 or to a telephone located outside of the network 35. The base station 31 makes this determination by comparing a telephone number (e.g., an extension number portion) included in the received call signal to numbers (e.g., extension numbers) for telephones 31b within the network 35. For cases where it is determined that the number from the received signal is similar to a number for a telephone 31b within the network 35, indicating that the call signal is intended to be delivered to a telephone 31b within network 35, the base station 31 forwards the call signal to this telephone via the PBX 31a. For cases where it is determined that the number from the received signal is not similar to any of the numbers for the telephones 31b within the network 35, indicating that the call signal is intended to be delivered to a telephone 31b located outside of the network 35, the base station 31 appends a dialing prefix to the number included in the call signal, and forwards the call signal to the telephone via the PBX 31a and PSTN 32a.

Although described in the context of a mobile terminal having a keypad for receiving input from a user, it is within the scope of this invention to employ any other suitable type of user input interface. By example, if the mobile terminal is connected to a computer, the user can employ the computers keyboard for entering information, and user-generated messages can be output from the computer via a cable or an IR link, and can displayed on the computer's screen. Alternatively, a suitable mobile terminal or computer voice recognition system can be employed by the user to enter the information. Also, although described in the context of the methods of the invention being performed using the mobile terminal 10, it should be understood that the methods may be employed in conjunction with any other suitable types of communication devices such as, by example, pagers.

Furthermore, and as was indicated previously, the teaching of this invention is not limited for use with any one particular type of message delivery/response protocol (such as the one specified by IS-136).

Furthermore, and as was stated earlier, the teachings of this invention are not limited for use with only two networks.

Thus, while the invention has been particularly shown and described with respect to preferred embodiments thereof, it will be understood by those skilled in the art that changes in form and details may be made therein without departing from the scope and spirit of the invention. By example, and as was previously described, the number of digits, the field width, and the format of each code portion of the respective telephone numbers described above are not intended to be limiting to the invention, and any other suitable numbers of digits, and other suitable field widths and formats may be employed.

What is claimed is:

1. A method for operating a mobile terminal, the method comprising the steps of:
 providing the mobile terminal with a first access code corresponding to a destination receiving device;
 initiating a call to the destination receiving device;
 determining, within the mobile terminal, whether the first access code must be modified to complete the call to the destination receiving device; and
 if it is determined that the first access code must be modified, performing steps of:
  modifying, within the mobile terminal, the first access code to produce a second access code; and
  transmitting a communications signal including the second access code to complete the call to the destination receiving device.

2. A method as set forth in claim 1, wherein prior to the initiating step, a step is performed of registering the mobile terminal with one of a plurality of communication networks, the plurality of communication networks including at least one autonomous network, and wherein the step of determining comprises the steps of:
 determining whether the first access code includes more than a predetermined number of digits; and
 if it is determined that the first access code does include more than the predetermined number of digits, determining if the user terminal is registered with the at least one autonomous network; and if it is determined that the user terminal is registered with the at least one autonomous network, performing the step of modifying by appending a predetermined code to the first access code to provide the second access code.

3. A method as set forth in claim 2, wherein the predetermined code is comprised of an extra-network dialing code for the at least one autonomous network.

4. A method as set forth in claim 2, wherein the step of transmitting is performed by transmitting the second access code towards the destination receiving device through the at least one autonomous network and at least another one of the plurality of communication networks.

5. A method as set forth in claim 2, wherein prior to the modifying step, a step is performed of providing the predetermined code to the user terminal within a message sent from the autonomous network.

6. A method as set forth in claim 1, wherein prior to the initiating step, a step is performed of registering the user terminal with one of a plurality of communication networks, the plurality of communication networks including at least one public network, and wherein the step of determining comprises steps of:

determining whether the first access code includes more than a predetermined number of digits; and if it is determined that the first access code includes more than the predetermined number of digits, determining if the mobile terminal is registered with the at least one public network, and if it is determined that the user terminal is registered with the at least one public network, performing the step of transmitting the first access code towards the destination receiving device through the at least one public network.

7. A method as set forth in claim 1, wherein prior to the initiating step, a step is performed of registering the user terminal with one of a plurality of communications networks, the plurality of communications networks including at least one network, and wherein the step of determining comprises steps of:

determining whether the first access code includes more than a predetermined number of digits; and if it is determined that the first access code does not include more than the predetermined number of digits, determining if the mobile terminal is registered with the at least one autonomous network, and if it is determined that the mobile terminal is registered with the autonomous network, transmitting the first access code towards the destination receiving device through the at least one autonomous network.

8. A method as set forth in claim 1, wherein prior to the initiating step, a step is performed of registering the mobile terminal in one of a plurality of communication networks, and wherein the step of determining comprises determining if the communication network in which the mobile terminal is registered is a public network, and if it is determined that the communication network is a public network, the modifying step is performed by appending a predetermined pre-extension code to the first code to generate the second access code.

9. A mobile terminal, comprising:

a transceiver for coupling said mobile terminal to a communication network;

a user-interface;

a memory, said memory storing an operating program for said user terminal;

a controller coupled to said transceiver, said memory, and to said user-interface, said controller operating under the control of said operating program and being responsive to receiving from said user-interface information specifying a first access code, said first access code corresponding to a destination receiving device and information specifying that the terminal initiate a call to the destination receiving device, the controller for determining whether the first access code must be modified to complete the call to the destination receiving device, said controller being responsive to determining that the first access code must be modified, by modifying the first access code to produce a second access code, and for initiating transmission of a communication signal, including the second access code, through said transceiver to complete the call to the destination receiving device.

10. A mobile terminal as set forth in claim 9, wherein the terminal operates in an autonomous network, and wherein said controller modifies the first access code by appending an extra-network dialing code for the autonomous network to the first access code so as to produce the second access code having the second format.

11. A mobile terminal as set forth in claim 9, wherein said controller further controls registration of the mobile terminal in one of a plurality of communication networks, the plurality of communication networks including at least one autonomous network, and wherein said controller determines whether the first access code must be modified by determining whether the first access code includes more than a predetermined number of digits and whether the mobile terminal is registered in the at least one autonomous network.

12. A mobile terminal as set forth in claim 9, wherein said controller further controls registration of the mobile terminal in one of a plurality of communications networks, the plurality of communication networks including at least one autonomous network and at least one public network, and wherein said controller determines whether the first access code must be modified by, at least in part, determining whether the mobile terminal is registered in an autonomous network or a public network of the plurality of communication networks.

* * * * *